United States Patent
Chalakov et al.

(10) Patent No.: US 10,789,217 B2
(45) Date of Patent: Sep. 29, 2020

(54) HIERARCHICAL NAMESPACE WITH STRONG CONSISTENCY AND HORIZONTAL SCALABILITY

(71) Applicant: Microsoft Technology Licensing, LLC, Redmond, WA (US)

(72) Inventors: Georgi M. Chalakov, Duvall, WA (US); Shane Kumar Mainali, Duvall, WA (US); Thomas Leo Marquardt, Newcastle, WA (US); Zichen Sun, Sammamish, WA (US); Maneesh Sah, Sammamish, WA (US); Esfandiar Manii, Kirkland, WA (US); Saurabh Pant, Bellevue, WA (US); Dana Yulian Kaban, Seattle, WA (US); Saher B. Ahwal, Redmond, WA (US); Jun Chen, Redmond, WA (US); Da Zhou, Seattle, WA (US); Amit Pratap Singh, Redmond, WA (US); Junhua Gu, Bothel, WA (US); Shaoyu Zhang, Shanghai (CN); Wei Chen, Shanghai (CN); Jingchao Zhang, Shanghai (CN); Quan Zhang, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 16/015,823

(22) Filed: Jun. 22, 2018

(65) Prior Publication Data
US 2019/0392053 A1    Dec. 26, 2019

(51) Int. Cl.
*G06F 16/188*    (2019.01)
*G06F 16/13*    (2019.01)
*G06F 16/185*    (2019.01)

(52) U.S. Cl.
CPC .......... *G06F 16/188* (2019.01); *G06F 16/137* (2019.01); *G06F 16/185* (2019.01)

(58) Field of Classification Search
None
See application file for complete search history.

(56) References Cited

U.S. PATENT DOCUMENTS 9,830,368 B1 * 11/2017 Otala ........................ G06F 8/41
10,157,476 B1 * 12/2018 Idrisov ..................... G06T 7/70
(Continued)

OTHER PUBLICATIONS

"Databricks File System—DBFS", Retrieved from: https://docs.databricks.com/user-guide/dbfs-databricks-file-system.html, Retrieved on Mar. 30, 2018, 6 Pages.
(Continued)

*Primary Examiner* — Wilson Lee
(74) *Attorney, Agent, or Firm* — Fiala & Weaver P.L.L.C.

(57) ABSTRACT

Methods, systems, and apparatuses are provided for a storage system that implements a hierarchical namespace service. A storage system includes a plurality of physical nodes and a plurality of sets of virtual nodes. Each set of virtual nodes is managed by a corresponding physical node. Each virtual node is configured to manage a respective set of directory blocks. Each directory block is a respective partition of a storage namespace and is managed by a corresponding single virtual node. Each virtual node maintains a directory block map. The directory block map maps file system object names in a hierarchical namespace to entity block identifiers in the flat namespace for entity blocks (files and folders) stored in directories corresponding to the managed set of directory blocks. Load balancing may be performed by moving virtual nodes between physical nodes, and by splitting directory blocks.

20 Claims, 11 Drawing Sheets

(56) References Cited

U.S. PATENT DOCUMENTS

| | | | | |
|---|---|---|---|---|
| 10,467,143 | B1* | 11/2019 | Mason | G06F 12/0875 |
| 2004/0133652 | A1* | 7/2004 | Miloushev | G06F 11/1076 709/214 |
| 2014/0082145 | A1 | 3/2014 | Lacapra | |
| 2015/0058384 | A1* | 2/2015 | Karamanolis | G06F 16/182 707/827 |
| 2016/0335304 | A1* | 11/2016 | Teodorescu | G06F 16/113 |
| 2018/0260409 | A1* | 9/2018 | Sundar | G06F 16/148 |

OTHER PUBLICATIONS

"Demystify failure detector, consider partial failure handling, latency optimizations", Retrieved from: https://issues.apache.org/jira/browse/CASSANDRA-3927, Retrieved on Mar. 30, 2018, 1 Page.

"Distributed Algorithms in Nosql Databases", Retrieved from: https://highlyscalable.wordpress.com/2012/09/18/distributed-algorithms-in-nosql-databases/, Sep. 18, 2012, 25 Pages.

"FILETIME structure", Retrieved from: https://msdn.microsoft.com/en-us/library/windows/desktop/ms724284(v=vs.85).aspx, Retrieved on Mar. 30, 2018, 2 Pages.

"Gossiper", Retrieved from: https://wiki.apache.org./cassandra/ArchitectureGossip, Retrieved on Mar. 30, 2018, 5 Pages.

"Lua the programming language", Retrieved from: http://www.lua.org/, Retrieved on Mar. 30, 2018, 1 Page.

"Microsoft Azure Storage Team Blog", Retrieved from: https://blogs.msdn.microsoft.com/windowsazurestorage/, Retrieved on Mar. 30, 2018, 5 Pages.

"Multiversion concurrency control", Retrieved from: https://en.wikipedia.org/wiki/Multiversion_concurrency_control, Retrieved on Mar. 30, 2018, 3 Pages.

"Nested set model", Retrieved from: https://en.wikipedia.org/wiki/Nested_set_model, Retrieved on Mar. 30, 2018, 5 Pages.

"The Hadoop FileSystem API Definition", Retrieved from: http://hadoop.apache.org/docs/current/hadoop-project-dist/hadoop-common/filesystem/index.html, Retrieved on Mar. 30, 2018, 1 Page.

"Trees", Retrieved from: https://vadimtropashko.files.wordpress.com/2011/07/ch5.pdf, Retrieved on Mar. 30, 2018, 39 Pages.

"Troels links: Relational database systems", Retrieved from: http://troels.arvin.dk/db/rdbms/links/#hierarchical, Mar. 30, 2018, 7 Pages.

Borthakur, Dhruba, "HDFS Architecture Guide", Retrieved from: https://hadoop.apache.org/docs/r1.2.1/hdfs_design.html., Retrieved on Mar. 30, 2018, 5 Pages.

Bradner, S, "Key words for use in RFCs to Indicate Requirement Levels", Retrieved from: https://tools.ietf.org/html/rfc2119, Mar. 1997, 3 Pages.

Calder, et al., "Windows Azure Storage: A Highly Available Cloud Storage Service with Strong Consistency", In Proceedings of the Twenty-Third ACM Symposium on Operating Systems Principles, Oct. 23, 2011, pp. 143-157.

Demers, et al., "Epidemic Algorithms for Replicated Database Maintenance", In Proceedings of the sixth annual ACM Symposium on Principles of distributed computing, Aug. 10, 1987, pp. 1-12.

Du, et al., "Clock-SI: Snapshot Isolation for Partitioned Data Stores Using Loosely Synchronized Clocks", In Proceedings of IEEE 32nd International Symposium on Reliable Distributed Systems, Sep. 30, 2013, 12 Pages.

Hayashibara, et al., "The Accrual Failure Detector", In Proceedings of the 23rd IEEE International Symposium on Reliable Distributed Systems, Oct. 18, 2004, 13 Pages.

Hazel, Dan, "Using rational numbers to key nested sets", In Journal of Computing Research Repository, Jun. 2008, pp. 1-18.

Hillyer's, Mike, "Managing Hierarchical Data in MySQL", Retrieved from: http://mikehillyer.com/articles/managing-hierarchical-data-in-mysql/, Retrieved on Mar. 30, 2018, 49 Pages.

Myers, et al., "Introduction to Azure Storage", Retrieved from: https://docs.microsoft.com/en-us/azure/storage/storage-introduction, Apr. 5, 2018, 12 Pages.

Neumann, et al., "Fast Serializable Multi-Version Concurrency Control for Main-Memory Database Systems", In Proceedings of the ACM SIGMOD International Conference on Management of Data, May 31, 2015, pp. 677-689.

Ousterhout, et al., "Prefix Tables: A Simple Mechanism for Locating Files in a Distributed System", Retrieved from: https://www.researchgate.net/publication/221459396_Prefix_Tables_A_Simple_Mechanism_for_Locating_Files_in_a_Distributed_System., Oct. 3, 1985, 17 Pages.

Roth, et al., "Hierarchical Data (SQL Server)", Retrieved from: https://docs.microsoft.com/en-us/sql/relational-databases/hierarchical-data-sql-server, Sep. 1, 2017, 14 Pages.

Tropashko, Vadim, "Trees in SQL: Nested Sets and Materialized", Retrieved from: http://www.dbazine.com/oracle/pr-articles/tropashko4/, Retrieved on Mar. 30, 2018, 13 Pages.

"International Search Report and Written Opinion Issued in PCT Application No. PCT/US19/036206", dated Sep. 23, 2019, 12 Pages.

* cited by examiner

300
/
/path1/
/path2/file1
/path2/file2
/path2/
/path2/path3/
/path2/path3/file3
FIG. 3
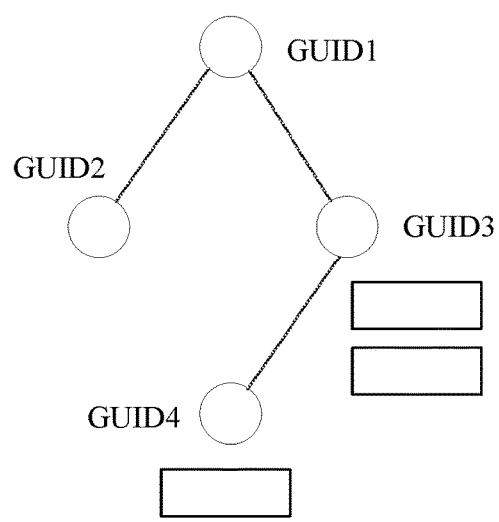
FIG. 4
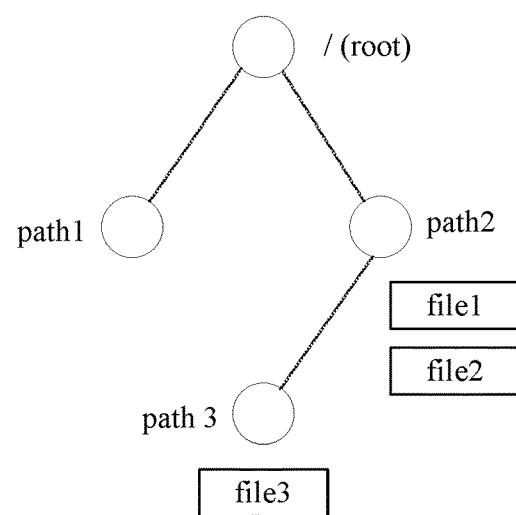
FIG. 5

600

| File Version(s) 612 | Directory Version(s) 614 |
|---|---|
| Entity Blocks (EBs) 610 ||
| Directory Blocks (DBs) 608 ||
| Virtual Nodes (VNs) 606 ||
| Physical Nodes (PNs) 604 ||
| Namespace Service 104 ||
| Master Table Service 602 ||

| | DBID (702) | Name (704) | CT (706) | Del | File | EBID (708) | |
|---|---|---|---|---|---|---|---|
| 1 | GUID-ROOT | . | 00001 | N | Y | GUID-FILE1 | 710A |
| 2 | GUID-ROOT | path1 | 00100 | N | N | GUID-PATH1 | |
| 3 | GUID-ROOT | path2 | 00200 | N | N | GUID-PATH2 | |
| 4 | GUID-PATH1 | . | 00100 | N | Y | GUID-FILE2 | 710B |
| 5 | GUID-PATH2 | . | 00200 | N | N | GUID-FILE3 | |
| 6 | GUID-PATH2 | file1 | 00300 | N | Y | GUID-FILE4 | |
| 7 | GUID-PATH2 | file1 | 00350 | N | Y | GUID-FILE4 | 710C |
| 8 | GUID-PATH2 | file1 | 00400 | N | Y | GUID-FILE4 | |
| 9 | GUID-PATH2 | path3 | 00400 | N | N | GUID-PATH3 | |
| 10 | GUID-PATH3 | . | 00400 | N | Y | GUID-FILE14 | 710D |
| 11 | GUID-PATH3 | file3 | 00401 | N | N | GUID-FILE15 | |

FIG. 7

HIERARCHICAL NAMESPACE WITH STRONG CONSISTENCY AND HORIZONTAL SCALABILITY

BACKGROUND

Cloud storage is a model of data storage in which digital data is stored in logical pools of storage embodied in physical storage devices hosted by a cloud storage provider. A cloud storage system may include a networked set of computing resources, including storage devices, servers, routers, etc., that are configurable, shareable, provide data security, and provide access to cloud storage to user devices over the Internet. A cloud storage system provides users the ability to store very large amounts of data for essentially any duration of time. Cloud storage system customers have access to their data from anywhere, at any time, and pay for what they use and store. Data stored in cloud storage may be durably stored using both local and geographic replication to facilitate disaster recovery.

Some cloud storage systems store file system objects in a flat global namespace. However, many big data and data analytics applications are designed to store data in a hierarchical namespace. For example, many big data and data analytics applications are configured to work with the Apache™ Hadoop® Distributed File System (HDFS). The HDFS design is based on requirements for a POSIX filesystem, but in a few key areas the POSIX semantics has been traded to increase data throughput rates. The POSIX namespace is a hierarchical namespace with unlimited depth of nesting and atomic operations over the namespace.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are provided for a storage system that implements a network-based storage hierarchical namespace. A storage system includes a plurality of physical nodes and a plurality of sets of virtual nodes. Each set of virtual nodes is managed by a corresponding physical node. Each virtual node is configured to manage a respective set of directory blocks. Each directory block is a respective partition of a storage namespace and is managed by a corresponding single virtual node. Each virtual node maintains a directory block map. The directory block map maps file system object names in a hierarchical namespace to entity block identifiers in the flat namespace for entity blocks (files and folders) stored in directories corresponding to the managed set of directory blocks. Load balancing may be performed by moving virtual nodes between physical nodes, and by splitting directory blocks.

Further features and advantages of the systems and methods, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present methods and systems and, together with the description, further serve to explain the principles of the methods and systems and to enable a person skilled in the pertinent art to make and use the methods and systems.

FIG. 3 shows an example of paths and files in a hierarchical directory structure, in accordance with an embodiment.

FIG. 4 shows hierarchical namespace topology corresponding to the hierarchical directory structure of FIG. 3, in accordance with an example embodiment.

FIG. 5 shows the hierarchical namespace topology of FIG. 4 with path and file names of FIG. 3 overlaid, in accordance with an example embodiment.

FIG. 6 shows a block diagram of an example architecture for implementing a hierarchical namespace service, in accordance with an example embodiment.

FIG. 7 shows an example master directory block table, in accordance with an example embodiment.

Figure 1:
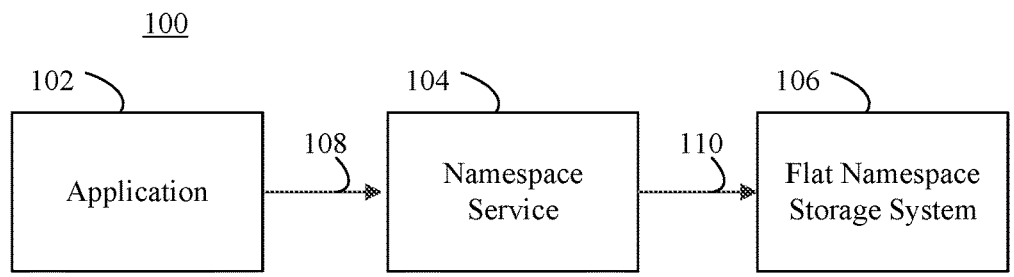
FIG. 1 shows a block diagram of a system that uses a hierarchical namespace service, in accordance with example embodiments.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present methods and systems. The scope of the present methods and systems is not limited to the disclosed embodiments. The disclosed embodiments merely exemplify the present methods and systems, and modified versions of the disclosed embodiments are also encompassed by the present methods and systems. Embodiments of the present methods and systems are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes, and are not limiting. The examples described herein may be adapted to any type of method or system for managing storage of and access to file system objects. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud storage is a model of data storage in which digital data is stored in logical pools of storage embodied in physical storage devices hosted by a cloud storage provider. A cloud storage system may include a networked set of computing resources, including storage devices, servers, routers, etc., that are configurable, shareable, provide data security, and provide access to cloud storage to user devices over the Internet. A cloud storage system provides users the ability to store very large amounts of data for essentially any duration of time. Cloud storage system customers have access to their data from anywhere, at any time, and pay for what they use and store. Data stored in cloud storage may be durably stored using both local and geographic replication to facilitate disaster recovery.

Some cloud storage systems, such as but not limited to Microsoft Azure® Blob Storage, store file system objects in a flat global namespace. However, many big data and data analytics systems are designed to store data in a hierarchical namespace. For example, many big data and data analytics systems are configured to work with the Apache™ Hadoop® Distributed File System (HDFS). The HDFS design is based on requirements for a POSIX filesystem, but in a few key areas the POSIX semantics has been traded to increase data throughput rates. The POSIX namespace is a hierarchical namespace with unlimited depth of nesting and atomic operations over the namespace. A challenge in providing HDFS semantics in existing cloud storage systems, such as Microsoft Azure® Blob Storage is the differences between the namespaces.

To enable true lift-and-shift of on-premises storage that uses a hierarchical directory structure to a cloud storage system that uses a flat namespace, as well as hybrid scenarios (a user that uses both on-premises storage implementing a hierarchical directory structure and cloud storage implementing a flat directory structure), embodiments disclosed herein provide a hierarchical namespace service. The hierarchical namespace service enables commands that refer to file system objects using hierarchical namespace identifiers to be executed against the file system objects in a flat namespace.

For instance, FIG. 1 shows a block diagram of a system 100 that utilizes a hierarchical namespace service in accordance with example embodiments. As shown in FIG. 1, system 100 includes an application 102, a hierarchical namespace service 104, and a flat namespace storage system 106. Each of these components may be executing on one or more computing devices. Connections between the components may be implemented via one or more network or peer-to-peer connections.

Flat namespace storage system 106 is intended to represent a cloud storage system that stores file system objects using a flat global namespace. In one example, flat namespace storage system 106 comprises Microsoft Azure® Blob Storage.

Application 102 is intended to represent a computer program that is configured to store and access data in a hierarchical namespace. By way of example only and without limitation, application 102 may comprise a big data or data analytics application that is configured to store and access file system objects in an HDFS hierarchical namespace. To store and access such file system object in the hierarchical namespace, application 102 generates first file system commands 108 that refer to file system objects using hierarchical namespace identifiers (e.g., path names in the hierarchical namespace).

Hierarchical namespace service 104 receives first file system commands 108, maps the hierarchical namespace identifiers included therein to identifiers of the file system objects in the flat namespace of flat namespace file system 106, and then generates second file system commands 110. Second file system commands 110 include references to the file system objects in the flat namespace of flat namespace storage system 106. In this way, hierarchical namespace service 104 enable first file system commands 108, which refer to file system objects using hierarchical namespace identifiers, to be executed against the corresponding file system objects in the flat namespace of flat namespace storage system 106.

To provide the foregoing functionality, hierarchical namespace service 104 maintains a mapping between the hierarchical namespace identifiers (or paths) and the flat namespace identifiers of the file system objects stored in flat namespace storage system 106. In one example embodiment, the mapping is maintained in a namespace table. By maintaining such a mapping, hierarchical namespace service 104 can execute file system commands such as "move file" or "move directory" in flat namespace storage system 106 without having to physically move a file or move a folder (and all of its contents, which could be tens, hundred, thousands, millions, billions, or even greater numbers of files) in storage. Instead, in each case, one or more map entries may be modified, rather than physically moving file system objects, which would entail expensive file system operations to execute. By changing map entries rather than performing expensive file system object operations, embodiments enable a significant reduction in processor operations and load.

Figure 2:
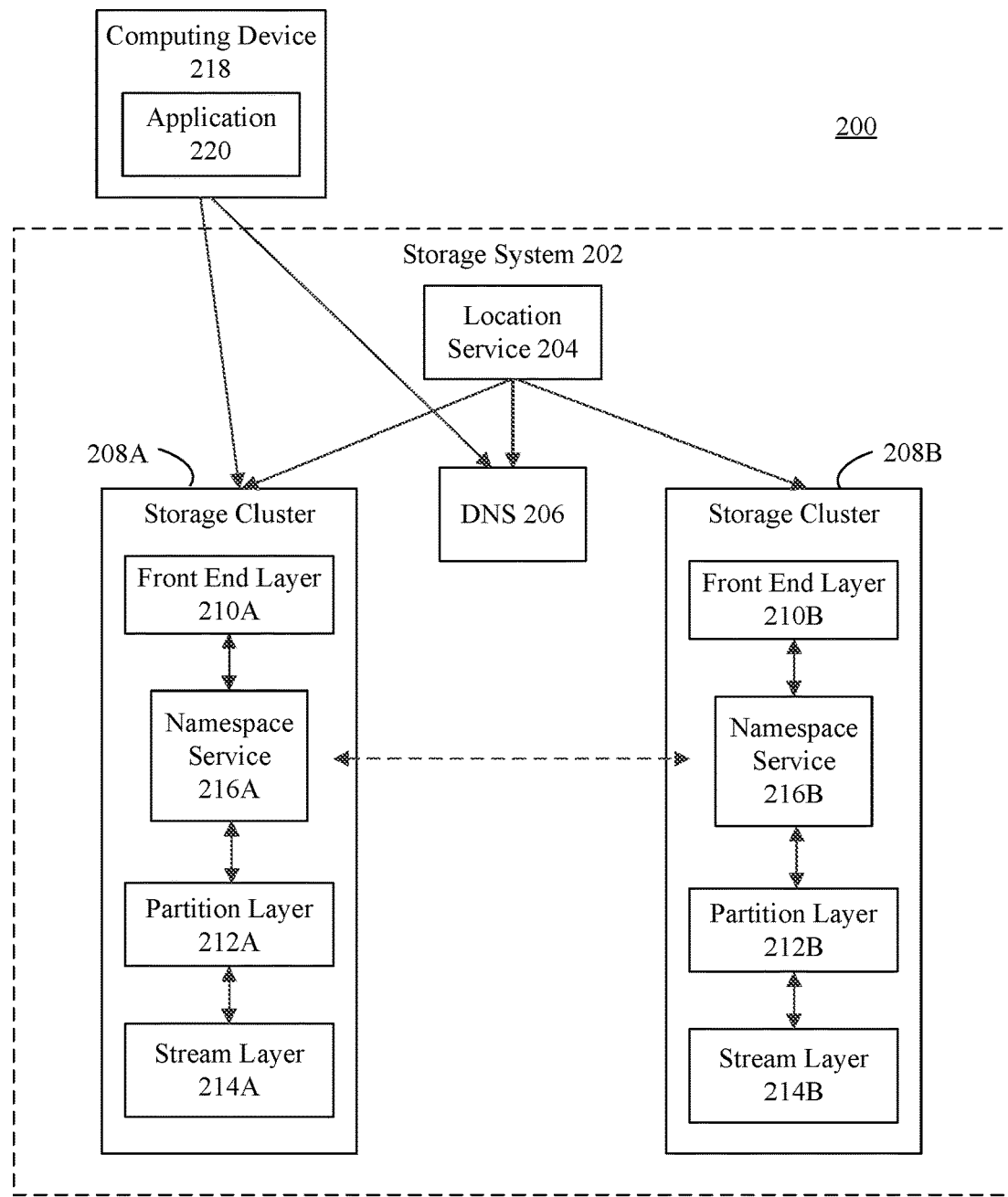
FIG. 2 shows a block diagram of a system that includes multiple instances of a hierarchical namespace service that enables file system commands that reference hierarchical namespace identifiers of file system objects to be applied to the file system objects in a flat namespace storage system, in accordance with example embodiments.

Hierarchical namespace service 104 may be implemented in a variety of types of storage systems. For instance, FIG. 2 shows a block diagram of a system 200 that includes multiple instances of a hierarchical namespace service that enables file system commands that use hierarchical namespace identifiers to refer to file system objects to be applied to the file system objects in a flat namespace, in accordance with example embodiments. System 200 includes a storage system 202 that stores file system objects on behalf of applications, such as an application 220 running on a computing device 218, wherein such applications can number in the tens, hundreds, thousand, millions, and even greater numbers of applications.

As shown in FIG. 2, storage system 202 includes a location service 204, a domain name service (DNS) 206, a first storage cluster 208A, and a second storage cluster 208B. First storage cluster 208A includes a front end layer 210A, a partition layer 212A, and a stream layer 214A, and partition layer 212A includes a hierarchical namespace service 216A. Second storage cluster 208B includes a front end layer 210B, a partition layer 212B, and a stream layer 214B, and partition layer 212B includes a hierarchical namespace service 216B. Storage system 202 may include any number of storage clusters implemented similarly to first and second storage clusters 208A and 208B, including numbers in the tens, hundreds, thousand, millions, and even greater numbers of storage clusters. Storage system 202 is described as follows.

Storage clusters 208A and 208B are each a cluster of N racks of physical storage servers, where each rack is built out as a separate fault domain with redundant networking and power. Each of storage clusters 208A and 208B may include any number of racks, with any number of physical storage servers per rack. Storage clusters may include raw storage of any amount, including petabytes (PB) or even greater amounts of storage. A storage cluster may be managed to keep the storage from being too fully utilized, which could lead to a performance fall off. As such, a storage cluster may be managed to a predetermined desired utilization, such as 70% or other value, in terms of capacity, transactions, and bandwidth, and avoiding going above or below predetermined utilizations bounds, thereby keeping storage in reserve for (a) disk short stroking to gain better seek time and higher throughput by utilizing the outer tracks of the disks and (b) to continue providing storage capacity and availability in the presence of a rack failure within a storage cluster. When a cluster reaches a high level of utilization, location service 204 may migrate accounts to different storage clusters using inter-cluster replication.

Location service 204 may be implemented in one or more servers and is configured to manage storage clusters 208A and 208B. Location service 204 is also responsible for managing the account metadata across all stamps. Location service 204 allocates accounts to storage clusters 208A and 208B and manages them across storage clusters 208A and 208B for disaster recovery and load balancing. Location service 204 may be distributed across multiple geographic locations for its own disaster recovery.

In an embodiment, storage system 202 includes storage in multiple locations in multiple geographic regions (e.g., North America, Europe, Asia, etc.). Each location may include a data center with one or more buildings containing multiple storage clusters. To provision additional capacity, location service 204 may add new regions, new locations to a region, or new storage clusters to a location. Therefore, to increase the amount of storage, one or more storage clusters may be deployed in the desired location's data center and added to location service 204. Location service 204 can allocate new storage accounts to those new storage clusters for customers as well as load balance (migrate) existing storage accounts from older storage clusters to the new storage clusters.

In FIG. 2, location service 204 tracks the resources used by each storage cluster, including storage clusters 208A and 208B, in production across all locations. When an application requests a new account for storing data, the application specifies the location affinity for the storage (e.g., US North). Location service 204 chooses a storage cluster within that location as the primary storage cluster for the account using heuristics based on the load information across all storage clusters (which considers the fullness of the storage clusters and other metrics such as network and transaction utilization). Location service 204 stores the account metadata information in the chosen storage cluster, which tells the storage cluster to start taking traffic for the assigned account. Location service 204 updates DNS 206 to allow requests to now route from a URI to that storage cluster's virtual IP (VIP) address (an IP address the storage cluster exposes for external traffic).

Front End (FE) layers 210A and 210B each includes a set of stateless servers that receive incoming requests from applications such as application 220. Upon receiving a request, the corresponding FE looks up the AccountName, authenticates and authorizes the request, then routes the request to a partition server in the corresponding one of partition layers 212A and 212B (based on the PartitionKey). Partition layers 212A and 212B each maintains a Partition Map that keeps track of the PartitionKey ranges and which partition server is serving which PartitionKeys for the storage cluster. The FE servers cache the Partition Map and use it to determine which partition server to forward each request to. The FE servers also stream large objects directly from the corresponding one of stream layers 214A and 214B, and cache frequently accessed data for efficiency.

Hierarchical namespace service 216A and 216B are respectively positioned between front-end layer 210A and partition layer 212A, and front-end layer 210B and partition layer 212B. Hierarchical namespace service 216A and 216B are each an example of hierarchical namespace service 104 of FIG. 1 and are configured to transform requests that utilize hierarchical namespace identifiers to refer to file system objects to requests directed to the file system objects in the flat namespace of storage clusters 208A and 208B.

Partition layers 212A and 212B are each configured for (a) managing and understanding higher level data abstractions (e.g., Blob, Table, Queue), (b) providing transaction ordering and strong consistency for objects, (c) storing object data on top of the corresponding stream layer, and (d) caching object data to reduce disk I/O.

Furthermore, partition layers 212A and 212B each enable scalability by partitioning the data objects within the corresponding storage cluster. As described earlier, data objects have a PartitionKey. The data objects may be broken down into disjointed ranges based on the PartitionKey values and served by different partition servers. Partition layers 212A and 212B each manage which partition server is serving what PartitionKey ranges for the data objects (e.g., Blobs, Tables, and Queues). In addition, partition layers 212A and 212B each provide automatic load balancing of PartitionKeys across the partition servers to meet the traffic needs of the data objects.

Stream layers 214A and 214B store the data on physical storage (e.g., hard disks, solid state storage, etc.) and are in charge of distributing and replicating the data across many servers to keep data durable within the corresponding storage cluster. Stream layers 214A and 214B can each be thought of as a distributed file system layer within a storage cluster. A stream layer understands files, called "streams" (which are ordered lists of large storage chunks called "extents"), how to store them, how to replicate them, etc., but does not understand higher level object constructs or their semantics. Data is stored in stream layers 214A and 214B but is accessible from corresponding front end layers 210A and 210B and partition layers 212A and 212B.

Note that data may be stored in storage of stream layers 214A and 214B in any form, including file system objects such as files and folders, binary large objects or Blobs (user files), Tables (structured storage), and Queues (message delivery). Stream layers 214A and 214B store data in the form of large files referred to as streams, and enables the corresponding partition layer to open, close, delete, rename, read, append to, and concatenate the streams. In an embodiment, a stream is an ordered list of extent pointers, where an extent is a sequence of append blocks. For example, a stream "//foo" may contains (pointers to) four extents (E1, E2, E3, and E4). Each extent contains a set of blocks that were appended to it. In one example, E1, E2 and E3 may be sealed extents, meaning they can no longer be appended to. In this example, only the last extent in the stream, E4, can be appended to. If an application reads the data of the stream "//foo" from beginning to end, the application receives the block contents of the extents in the order of E1, E2, E3 and E4.

In further detail, a block is a minimum unit of data for writing and reading. In an embodiment, a block can be up to N bytes (e.g., 4 MB). Data is written (appended) as one or more concatenated blocks to an extent, where blocks do not have to be the same size. An append may be specified in terms of blocks and the size of each block. A read gives an offset to a stream or extent, and the stream layer reads as many blocks as needed at the offset to fulfill the length of the read. When performing a read, the entire contents of a block are read. For instance, the corresponding stream layer may store its checksum validation at the block level, one checksum per block. The whole block is read to perform the checksum validation and may be checked on every block read. All blocks may be validated against their checksums once every few days to check for data integrity issues.

An extent is the unit of replication in the stream layer, and one example default replication policy is to maintain three replicas within a storage cluster for an extent. Each extent is stored in a file and consists of a sequence of blocks. The target extent size used by the partition layer may be 1 GB, for example. To store small objects, the partition layer appends many of them to the same extent and even in the same block. To store large TB (terabyte)-sized objects (e.g., Blobs), the object may be broken up over many extents by the partition layer. The partition layer keeps track of what streams, extents, and byte offsets in the extents in which objects are stored as part of its index.

Every stream has a name in the stream layer, and a stream appears as a large file to the partition layer. Streams may be appended to and can be randomly read from. A stream is an ordered list of pointers to extents which is maintained by a stream manager of the stream layer. When the extents are concatenated together they represent the full contiguous address space in which the stream can be read in the order they were added to the stream. A new stream can be constructed by concatenating extents from existing streams, which can be a fast operation because just a list of pointers is updated. Only the last extent in the stream can be appended to. All of the prior extents in the stream are immutable.

Storage system 202 provides a single global namespace that allows clients to address all of their storage and scale to arbitrary amounts of storage needed over time. To provide this capability, DNS 206 is leveraged as part of the storage namespace, and the storage namespace is defined in three parts: an account name, a partition name, and an object name. As a result, data is accessible in storage system 20 via a URI of the form:

http(s)://AccountName/FileSystemName/ObjectName

The AccountName is the customer selected account name for accessing storage and is part of the DNS host name. The AccountName DNS translation is performed by DNS 206 to locate the primary storage cluster of first and second storage clusters 208A and 208B (or other storage cluster) and data center where the data is stored. This primary location is where all requests go to reach the data for that account. An application, such as application 220, may use multiple AccountNames to store its data across different locations. The FileSystemName locates the data once a request reaches the storage cluster. The PartitionKey is logically a composite of AccountName;FileSystemName; ObjectName. Storage system 202 supports atomic transactions across objects with the same PartitionKey value. PartitionKey is used to scale out access to the data across storage servers based on traffic needs. A partition could hold just a single file/object or it could hold half of the files/objects in a file system or it could hold all of the files/objects across multiple file systems. The partitioning may be managed by a master table service (described elsewhere herein).

This naming approach enables storage system 202 to flexibly support multiple data abstractions. For example, with respect to Blobs, the full blob name is the PartitionKey. A blob can have snapshots. As noted above, the PartitionKey is AccountName;FileSystemName;ObjectName, but the RowKey, which identifies objects within a partition key, is AccountName;FileSystemName;ObjectName;SnapshotVersion, so the system can transactionally operate on snapshots for the same file/object.

The hierarchical and flat namespaces are described as follows. For instance, FIG. 3 shows an example of directory paths and files in a hierarchical directory structure 300, in accordance with an embodiment. FIG. 4 shows a hierarchical namespace topology 400 corresponding to hierarchical directory structure 300 of FIG. 3, in accordance with an example embodiment. Topologically, hierarchical namespace topology 400 is a tree. The tree is formed of nodes and relationship of the nodes. Every node, except the root, has a parent. In addition to the parent, each node has set of assigned attributes, one of which is the name of the node. The node's name is unique in the name of the nodes that have the same parent. The names can change with no effect on the topology. Changes in topology do not affect names or properties. In hierarchical namespace topology 400, each node is shown assigned a unique nonvolatile identifier, such as a GUID (globally unique identifier) that may be used to identify each node in a flat namespace. Herein, the unique nonvolatile identifier is frequently referred to as a GUID, although this reference is for illustrative purposes. Embodiments are applicable to identifying file system objects, such as files and folders, using any type of unique nonvolatile identifier, such as a GUID, multiple GUIDs, a GUID plus timestamp, or any other type of identifier that does not change and is unique within the relevant scope of the storage system.

For example, FIG. 4 shows GUID1-GUID4, which are unique identifiers corresponding to /, path1/, path2/, and path3/ of hierarchical directory structure 300 of FIG. 3. GUID1 is an identifier for the root directory, GUID2 is an identifier for the path1 directory under the root directory, GUID3 is an identifier for the path2 directory under the root directory, and GUID4 is an identifier for the path3 directory under the path2 directory. Two files (file1 and file2) are under the path2 directory, and a file (file3) is under the path3 directory. FIG. 5 shows hierarchical namespace topology 400 with the path and file names of FIG. 3 overlaid on the nodes.

As can be seen from FIG. 5, hierarchical namespace service 104 maps hierarchical namespace identifiers of file system objects (e.g., /path2/) to identifiers of those file system objects (e.g., GUIDs) in a flat namespace. Hierarchical namespace service 104 may be implemented in various ways. For instance, FIG. 6 shows a block diagram of an example architecture 600 for implementing hierarchical namespace service 104, in accordance with an example embodiment. As shown in FIG. 6, architecture 600 includes a master table service 602, hierarchical namespace service 104, physical nodes 604, virtual nodes 606, directory blocks 608, entity blocks 610, one or more file versions 612, and one or more directory versions 614. Generally, each element in architecture 600 comprises part of and/or is managed by the element shown below it. Architecture 600 is described as follows.

Master table service 602 is configured to manage various data structures used to implement storage system 202 (FIG. 2), such as data objects (e.g., blobs, files, directories, etc.), queues, etc. For example, the data structures may have the form of tables, and may track objects in storage, such as by including identifiers for the objects, indicating locations (e.g., partitions) where the objects are stored (e.g., indicated by partition keys), timestamps for storage of the objects, etc. In an embodiment, each row of a table may have a schema, and may be accessed by a partition key and a row key, referred to as a primary key of the row. Master table service 602, which may be implemented in the partition layer for a storage cluster, may maintain a namespace table (also referred to herein as a "master directory block map") as a persistent store of the namespace state and of the managed partitions of the storage cluster. The master directory block map may maintain a mapping between hierarchical namespace identifiers (e.g., path names) of file system objects and flat namespace identifiers (e.g., GUIDs) of those file system objects as well as an indication of the parent-child relationships between the file system objects.

Hierarchical namespace service 104, as described above, is a service that receives file system commands that refer to file system objects using hierarchical namespace identifiers, maps the hierarchical namespace identifiers to flat namespace identifiers, and then applies the commands against the file system objects in a flat namespace using the flat namespace identifiers. In an embodiment, hierarchical namespace service 104 comprises a set of physical nodes 604, which manage virtual nodes 606 that perform these functions in a distributed manner.

In an embodiment, each physical node of physical nodes 604 may be implemented as a physical machine. For example, a physical node may be implemented as a physical server. The physical server may execute and/or implement one or more of virtual nodes 606, such as by executing a hypervisor that presents a virtual operating platform that virtual nodes may run upon in the form of virtual machines. Many physical nodes may be present in a storage cluster, such as one thousand physical nodes or other number.

The number of virtual nodes 606 managed by physical nodes 604 may be scalable or may be a predefined or static number. Many virtual nodes may be present in a storage cluster for implementing a hierarchical namespace service, such as ten thousand virtual nodes or other number. Virtual nodes may be moved between physical nodes. For example, if a first virtual node is too busy (e.g., operating over a processor utilization level threshold) and a second virtual node is also busy, and they are both managed by (e.g., running upon) the same physical node, one of the virtual nodes may be transferred to another physical node that is available and has enough resources. As such, load balancing may be performed by hierarchical namespace service 104 by shifting virtual nodes 606 among physical nodes 604. Virtual nodes 606 may each maintain their state in a persistent storage so that at any time, a virtual node may be moved and/or restarted on a different physical node 606. In an embodiment, a different identifier (e.g. a numeric identifier (ID)) is associated with each of virtual nodes 606, and only one instance of a virtual node having a given identifier is running at any given time.

Directory blocks 608 correspond to hierarchical namespace directories. In general, a single directory block corresponds to a single directory. When a directory is created, a GUID is generated and assigned to the directory to become a permanent name of the directory. In an embodiment, a hash function is performed on the GUID to generate a hash result. The hash result is used to determine a permanent place for the directory block of the directory. In an embodiment, the directory is assigned to a virtual node having a numeric ID that matches the hash result, and that assignment does not change (unless load balancing changes the assignment). The directory is permanently managed by that virtual node via the GUID.

Directory blocks 608 are managed by a respective virtual node 606, with every directory block corresponding to a directory (root or sub-) or a portion of a directory in a hierarchical namespace. Inside directory block 608 are entity blocks 610, with each entity block being a file or a folder. Note that any number of directory blocks 608 and entity blocks 610 may be managed by hierarchical namespace service 104, including numbers in the billions.

Each entity block may have multiple versions. A file entity block has one or more versions indicated as file version(s) 612, and a folder/directory entity block has one or more versions indicated as directory version(s) 614. Any number of versions may be present for directory blocks 608 and entity blocks 610, including numbers in the ones, tens, hundreds, thousands, or even greater numbers of versions. The versions of an entity block are contained behind the specific name. For example, if attributes of a file named "foo" are changed, a new version of "foo" is generated, and all versions of "foo" share the same name. Entity block versions enable using multi-version concurrency control (MVCC). According to MVCC, the namespace is capable of executing transactions not only at the current moment for an entity block, but also for the entity block at points in the past, by executing a transaction against an earlier version of the entity block that was current at the time the transaction was received (e.g., as verified by comparing timestamps).

As mentioned above, master table service 602 may manage data structures that map file system objects in a hierarchical namespace, such as folders and files, to file system object identifiers in a flat namespace, and that indicate parent-child relationships between the file system objects. Such data structures for mapping may have any form, such as the form of tables. For instance, FIG. 7 shows an example master directory block table 700, in accordance with an example embodiment. Master directory block table 700 is an example of a data structure that may be used to map hierarchical namespace identifiers of file system objects to flat namespace identifiers and to identify parent-child relationships between the file system objects. As shown in FIG. 7, master directory block table 700 includes a directory block identifier (DBID) column 702, a name column 704, a commit time (CT) column 706, and an entity block identifier (EBID) column 708, and may optionally include further columns such as a deleted indication column (the "delete flag"), a file indication column, and/or further columns. Master directory block table 700 is described in further detail as follows.

Master directory block table 700 may be managed by master table service 602 of FIG. 6, while hierarchical namespace service 104 may manage a version of master directory block table 700 that is distributed over many locations. For instance, each virtual node of virtual nodes 606 may maintain/store and manage a corresponding portion of master directory block table 700, referred to herein as a directory block map. For example, directory block table 700 is shown segmented into portions 710A, 710B, 710C and 710D. Each of portions 710A-710D corresponds to a particular set of one or more directory blocks and entity blocks in storage in the form of one or more rows. Furthermore, each of portions 710A-710D may be managed by a corresponding virtual node. For instance, a first virtual node may maintain first portion 710A, a second virtual node may maintain second portion 710B, a third virtual node may maintain third portion 710C, and a fourth virtual node may maintain fourth portion 710D. By distributing the maintenance of master directory block table 700 across the virtual nodes in this fashion, performance of hierarchical namespace service 104 is improved.

DBID column 702 stores an identifier for each directory block in the form of a DBID. A DBID is unique identifier that never changes for a particular directory block. In one embodiment, a DBID is a 128-bit GUID generated for every new directory block.

EBID column 708 stores an identifier for each entity block in the form of an EBID. When an entity block is a directory, the assigned EBID is also the DBID for the directory. When the entity block is a file, the EBID is a unique identifier that never changes for that entity block. If an entity block has multiple versions, the versions are listed in corresponding rows in the directory block map (to enable MVCC). The different versions represent different states of the file or directory of the entity block at corresponding different specific time intervals. In an embodiment, the EBID for an entity block is a GUID.

In the example of FIG. 7, three versions of a same entity block are listed in row entries 6, 7, and 8 inclusive. Rows 6, 7, and 8 list the same DBID and EBID, but have different values in a commit time (CT) column 706, which indicates a time at which the respective version of the entity block was committed to storage. As such, a version of the entity block is valid for reading only when a transaction read timestamp (RT) of a command directed to the entity block has a value between the commit time of the version and the commit time of the next version of the entity block (or the present time if there is no next version). In this manner, a command may act on the version of an entity block that was valid at the time the command was issued, rather than on the most recent version of the entity block.

Accordingly, in master directory block table 700, each row represents a version of an entity block. The primary key (PK) for master directory block table 700 is the DBID. The row key (RK) is the name (in name column 704) for the entity block and the commit time. Table 1 shows example types and description for various columns that may be present in master directory block table 700, including the columns shown in FIG. 7.

TABLE 1

| Key? | Column/Name | Type | Description |
|---|---|---|---|
| PK | DBID | BINARY | Unique Directory Identifier |
| RK | Name | VAR CHAR | File or Directory name (e.g., UTF-8) |
| RK | Commit Time | CHAR | The first transaction when this version in EB visible (deleted) |
|  | Deleted | BIT | Is this a delete record? |
|  | File | BIT | Is this file or directory? |
|  | EBID | BINARY | Unique Entity Block Identifier. |
|  | ... |  | Additional Columns for every associated property. |

In an embodiment, data in master directory block table 700 is rendered immutable. Create, Update, and Delete commands add a new row in the table. A garbage collection (GC) process may be implemented to removes old rows from the table at predetermined intervals or otherwise.

When a client (e.g., application 220 of FIG. 2) changes a file or directory property, the change is indicated in the directory block of the parent directory of the file or directory. For example, the result of changing an access attribute of a file is the insertion of a row in master directory block table 700 with a DBID equal to the EBID of the parent folder, the name of the file, an EBID equal to file's EBID, and the new value of the attribute.

However, there are directory properties that a client can change indirectly. For example, the last write timestamp for a directory changes when a client creates a new file in the directory. For those cases, each directory may have a special file (e.g., with internal name ".") referred to as a "dot file," where directory attributes that may change indirectly are maintained. The dot file may maintain such properties locally with the directory and, at predefined intervals, at least some of these properties may be copied from the dot file to the properties in the parent directory's directory block where a client can view them. For example, a last read time may be propagated to the client's section once every hour. The propagation can be performed on a more complex schedule. For example, when a directory timestamp changes, the updated time may be propagated to the parent directory first immediately and then later after a predefined period of time.

As mentioned above, a directory block map is a distributed portion of master directory block table 700 that is associated with a virtual node. Each virtual node maintains a corresponding portion of master directory block table 700 as a directory block map. In an embodiment, the directory block map is maintained in main memory. In main memory, the directory block map may maintain its data, such as the directory block and entity block identifiers, in the form of a hash table and tries. The memory representation is optimized for supporting live transactions and keeping a small part of hot data.

For every entity block listed in a directory block map of a virtual node, rows for the last few versions are maintained with information about the state of transactions and a flag that shows whether or not there are more earlier (older) versions in master directory block table 700. An entity block's versions are a list of entity blocks. The list grows from the head. If too many entries are in the list, the oldest entries can be discarded, and an indication may be made at the tail of the list that more versions are stored in master directory block table 700 and/or in one or more name resolution caches (described in further detail below). In memory, a directory block provides quick access to the mapping between client-specified names (of name column 704) and EBIDs (of EBID column 708).

In an embodiment, an additional data structure is provided as another distributed form of master directory block table 700. The additional data structure is referred to herein as a name resolution cache and forms a distributed cache service. As will be discussed in more detail herein, the name resolution cache is used by virtual nodes that are configured to perform a name resolution function that maps hierarchical namespace directory names (or paths) to DBIDs. Such name resolution nodes may obtain the necessary name-to-DBID mappings from other virtual nodes (referred to herein as storage nodes), but afterward store those name-to-DBID mappings in a local name resolution cache so that subsequent name resolution operations can be performed more efficiently. Each virtual node may have an associated name resolution cache. The nature of the service provided by the name resolution cache is a key value store. The key is sequence of bytes. The name resolution cache supports sparse streams as values.

For example, an entry in the name resolution cache may comprise a representation of one value with 3 versions: v1, v2, and v3. At offset TS1 through offset TS2, V1 can be written, at offset TS2 through offset TS3, value v2 can be written, and from offset TS3 until an end of the name resolution cache (e.g., offset 2^64), value v3 can be written. Subsequently, the name resolution cache can be read at any offset of the stream and the name resolution cache will return the correct value.

Entity blocks and directory blocks may be cached in a name resolution cache by a virtual node. With regard to an entity block, the name resolution cache key is DBID+EBID. A stream may be written into an entity block version between the offsets of the commit transaction that introduced the data and the commit transaction for the next version. The read of the entity block is performed by a specific timestamp that used as the offset in the stream. The name resolution cache returns the data stored within a range in which the offset falls. When a newer value is stored, the previously stored values are rewritten. With regard to a directory block, the name resolution cache key is DBID+EBID. Timestamps of earlier requests are written into the stream list of EBIDs.

If, upon a read operation, the name resolution cache returns data, the data is considered correct until some point in time. This point of time could be the current time or a time in the past. The namespace data is immutable, so there is no issue with reading invalid data, but there might be a newer version of the data that has not been uploaded in the name resolution cache. In this case, the results from local memory (the directory block map) and the name resolution cache are combined. Because the name resolution cache is updated with every write to the master directory block table 700, if no newer version is present in the directory block map, the name resolution cache version is the latest.

Accordingly, embodiments of a hierarchical namespace service implement maps for mapping between hierarchical namespace identifiers of file system objects and flat namespace identifiers of those file system objects at multiple levels, including master directory block table 700, the directory block maps at the virtual nodes (distributed), and the name resolution caches at the virtual nodes (distributed), providing redundancy, greater efficiency (e.g., reduced traffic in requesting mapping information), and faster operation (e.g., via faster access to nearby mapping information, storing hashes of identifiers for faster compares, etc.).

Figure 8:
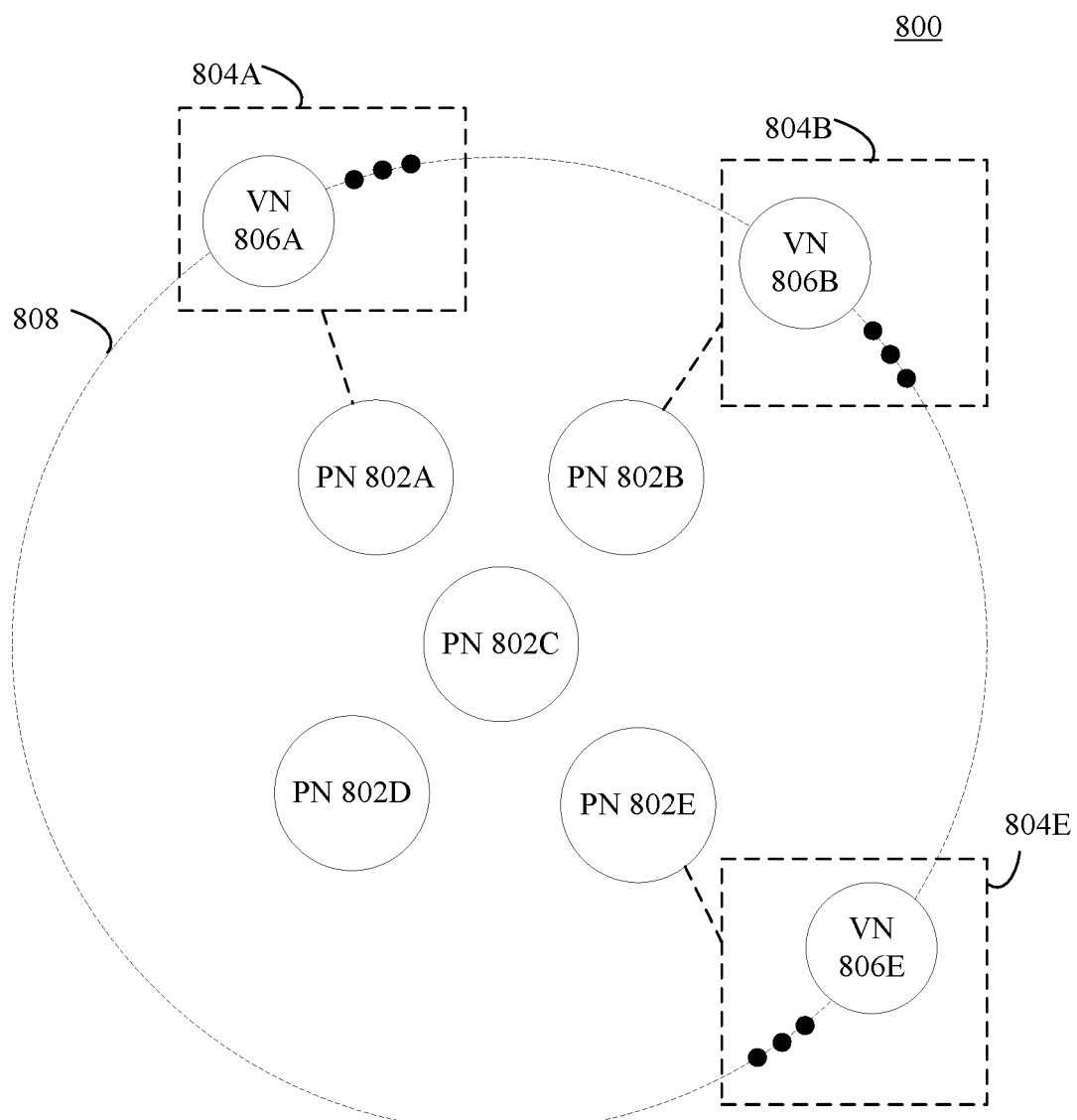
FIG. 8 shows a block diagram of a hierarchical namespace service that includes physical nodes and virtual nodes, in accordance with an example embodiment.

Hierarchical namespace service 104 may be implemented as physical and virtual nodes in various ways to use the mapping information to process file system transaction requests, in embodiments. For instance, FIG. 8 shows a block diagram of a hierarchical namespace service 800 that includes physical nodes and virtual nodes, according to an embodiment. As shown in FIG. 8, hierarchical namespace service 800 includes a plurality of physical nodes 802A-802E and a plurality of sets of virtual nodes 808 (represented as a dotted circle). Sets of virtual nodes 808 includes a first set of virtual nodes 804A, a second set of virtual nodes 804B, and a third set of virtual nodes 804E. First set of virtual nodes 804A includes a first virtual node 806A and optionally one or more further virtual nodes. Second set of virtual nodes 804B includes a second virtual node 806B and optionally one or more further virtual nodes. Third set of virtual nodes 804E includes a third virtual node 806E and optionally further virtual nodes. Hierarchical namespace service 800 is further described with reference to FIG. 9.

Figure 9:
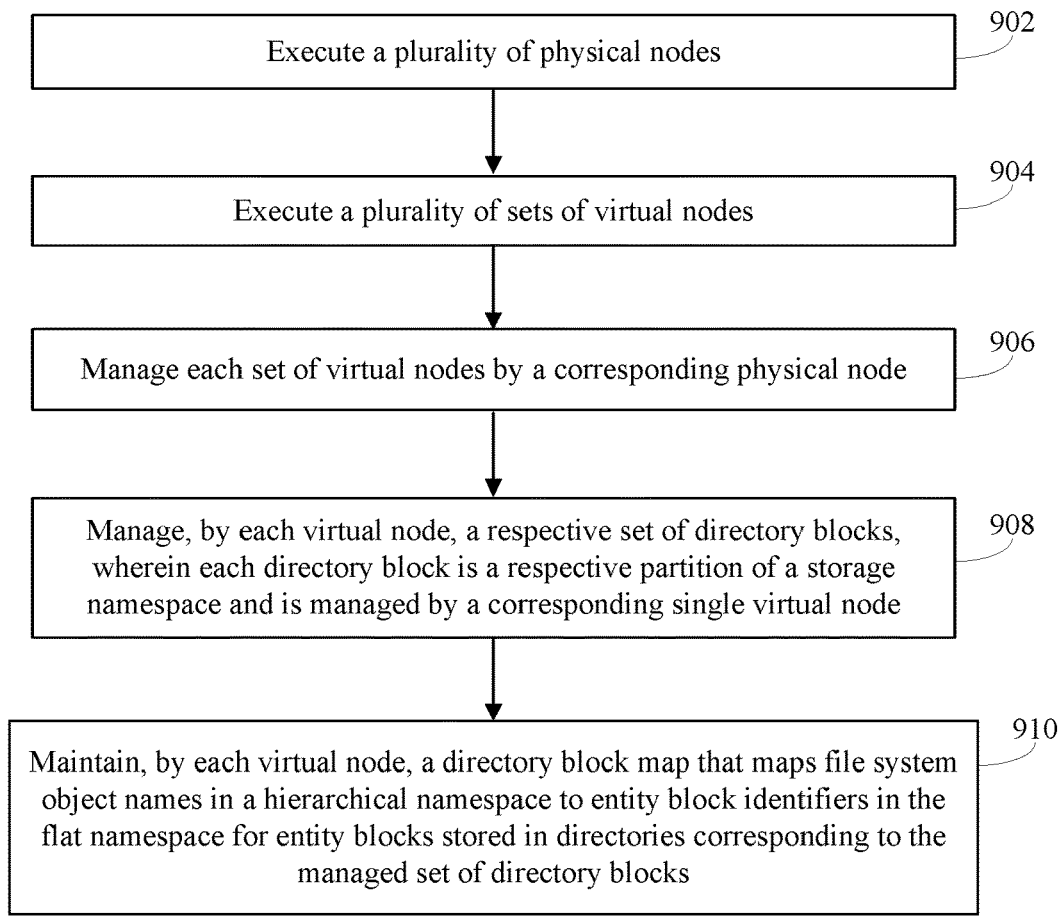
FIG. 9 is a flowchart of a process for a namespace mapping system to map commands from a hierarchical namespace to a flat file structure, in accordance with an example embodiment.

FIG. 9 shows a flowchart 900 of a process for a namespace mapping system to map commands from a hierarchical namespace to a flat file structure, in accordance with an example embodiment. In an embodiment, hierarchical namespace service 800 may operate according to flowchart 900. Flowchart 900 and hierarchical namespace service 800 are described as follows.

In step 902, a plurality of physical nodes is executed. In an embodiment, physical nodes 802A-802E execute in one or more servers as physical machines (not shown in FIG. 8). Any number of physical nodes may be present, including numbers in the tens, hundreds, thousands, and even greater numbers of physical nodes. In an embodiment, the physical nodes in a storage cluster perform a same role, as described herein. Each physical node is independent and communicates with the other physical nodes.

In step 904, a plurality of sets of virtual nodes is executed. As shown in FIG. 8, virtual nodes 808, including first, second, and third sets of virtual nodes 804A, 804B, and 804E, execute. Any number of virtual nodes may be present, including numbers in the hundreds, thousands, tens of thousands, hundreds of thousands, and even greater numbers of virtual nodes. A virtual node may be implemented in various ways, including as a virtual machine that runs on a physical node.

In step 906, each set of virtual nodes is managed (e.g., hosted/run) by a corresponding physical node. For example, as shown in FIG. 8, physical node 806A manages first set of virtual nodes 804A, physical node 802B manages second set of virtual nodes 804B, and physical node 802E manages third set of virtual nodes 804E. Each set of virtual nodes managed by a physical node may include any number of virtual nodes. Note that each physical node may manage a different number of virtual nodes and some physical nodes may not manage any virtual nodes at a given time. For example, physical nodes 802C and 802D may not be managing any virtual nodes at the current time, but subsequently, one or more virtual nodes may be transferred to physical nodes 802C and 802D from other physical nodes (e.g., for load balancing).

In step 908, each virtual node manages a respective set of directory blocks, wherein each directory block is a respective partition of a storage namespace and is managed by a corresponding single virtual node. The namespace table maintains a mapping between hierarchical namespace identifiers (e.g., path names) of file system objects and flat namespace identifiers (e.g., GUIDs) of those file system objects as well as an indication of the parent-child relationships between the file system objects. In an embodiment, each of the virtual nodes of sets of virtual nodes 804A, 804B, and 804E may manage a respective set of one or more directory blocks, although some virtual nodes may be managing zero directory blocks at a particular time. As described elsewhere herein, each directory block is managed by a same, particular virtual node.

In step 910, a directory block map is managed by each virtual node that maps file system object names in a hierarchical namespace to entity block identifiers in the flat namespace for entity blocks stored in directories corresponding to the managed set of directory blocks. In an embodiment, each virtual node of sets of virtual nodes 804A, 804B, and 804E manages a corresponding directory block map. As described above, the directory block map may be a data structure maintained in memory. The directory block map, for a virtual node, contains entries that map hierarchical file object system names to entity block identifiers of corresponding entity blocks stored in directories corresponding to the set of directory blocks managed by the virtual node.

Accordingly, hierarchical namespace service 104 provides for the management of a namespace used to address file system objects in storage, and may be implemented in the form of physical nodes and virtual nodes. Further detail regarding such embodiments are provided in the following subsections, including a subsection describing further embodiments for mapping commands between file systems, followed by a subsection describing further embodiments for load balancing within a namespace service.

A. Example Embodiments for File System Mapping of Commands

Figure 10:
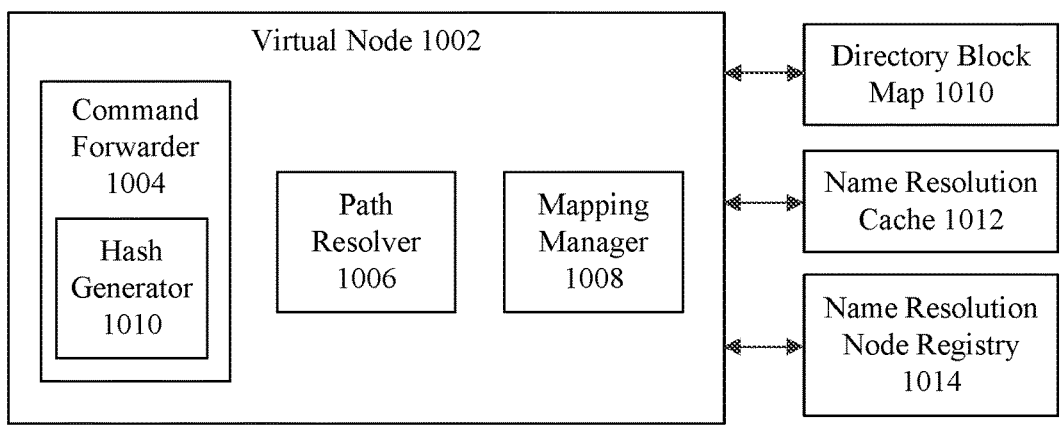
FIG. 10 shows a block diagram of a virtual node, in accordance with an example embodiment.

Virtual nodes of FIG. 8 may be implemented in various ways. For instance, FIG. 10 shows a block diagram of a virtual node 1002, in accordance with an embodiment. Each virtual node of FIG. 8 may be implemented similarly to virtual node 1002, in an embodiment. As shown in FIG. 10, virtual node 1002 includes a command forwarder 1004, a path resolver 1006, and a mapping manager 1008. Command forwarder 1004 includes a hash generator 1010. Furthermore, virtual node 1002 maintains a directory block map 1010, a name resolution cache 1012, and a name resolution node registry 1014. These features of virtual node 1002 are described as follows.

Command forwarder 1004 of virtual node 1002 is configured to receive commands containing file system operations directed to entity blocks stored in the storage cluster managed by the hierarchical namespace service, such as hierarchical namespace service 800. When a client sends a command directed to a file system entity block, the client uses the name of the file or the directory (i.e., a hierarchical namespace identifier of the file system object), including the path name to the file or directory. In an embodiment, when virtual node 1002 is not the virtual node that manages the identified file or directory, virtual node 1002 operates as a "query node" to forward the received command for processing. In such a case, command forwarder 1004 determines another virtual node (referred to as the "name resolution node") to handle identifying still another virtual node that manages the file or directory (referred to herein as the "storage node") and therefore is configured to execute the command. In an embodiment, hash generator 1010 of command forwarder 1004 may perform a hash function on the path name, such as a CRC64 algorithm or other suitable hash function, to generate a hash result. The hash result identifies the name resolution node. Command forwarder 1004 forwards the received command to the identified name resolution node.

Path resolver 1006 of virtual node 1002 is configured to receive commands from query nodes, resolve directory names (or paths) included in those commands to flat namespace identifiers, and use the flat namespace identifiers to identify the virtual nodes that are the storage nodes for managing the directories or files to which the commands are directed. In particular, for a given command, path resolver 1006 resolves a directory name or path included in a command to a DBID. The name resolution is performed efficiently and in a manner that is strongly consistent with respect to all transactions. It is noted that the mapping between a path name and a DBID may change, such as when a directory is renamed, and this may affect name resolution caching for all the children of the renamed directory, including indirect children of the directory. In some cases, name resolution cache 1012 of virtual node 1002 may store a mapping of the path name to the DBID of the file or directory in the command. In such a case, path resolver 1006 may forward the command to the storage node of that DBID. Otherwise, path resolver 1006 resolves the storage node by processing the path name.

In particular, path resolver 1006 may begin processing the path name in the command at the root and work its way down path portion by path portion, to determine the relevant storage node for executing the command. In particular, for the path name of /path1/path2, path resolver 1006 may communicate with the virtual node managing the root partition to determine the DBID for the first directory in the path name (e.g., /path1). The virtual node managing the root partition finds the first directory in its directory block map 1010 and supplies the DBID back to path resolver 1006. Then, path resolver 1006 may communicate with the virtual node that manages the directory block for that DBID to determine the DBID for the second directory in the path name (e.g., /path2). The virtual node managing /path1 finds the second directory in its directory block map 1010 and supplies the DBID back to path resolver 1006. This process may be repeated for any further path name portions. Eventually, path resolver 1006 determines the DBID for the directory block that contains the entity block to which the command is directed and transmits the command to the storage node that manages that directory block.

With path resolver 1006, any virtual node can find and return DBIDs for a path at a specific RT (read timestamp). In the process of finding the mapping, virtual node 1002 also registers for notifications with all DBID owners of the path for a time period, such as 1 hour, in their corresponding name resolution node registries 1014. If a change occurs anywhere in the path name before the time expires, the corresponding manager of that path name portion notifies every virtual node registered for that path name that the change occurred, and the entry for that path name in name resolution cache 1012 for the registered virtual nodes is invalid.

Note that the registration at the storage node may have a predetermined expiration time (lease), such as 1 min. If in the next time period (e.g., 45) seconds, a new request is received by the name resolution node with regard to the same entity block, the name resolution node resolves the name using its name resolution cache 1012 without sending new registration messages to the DBID owner(s). After that, if a new request is received by the name resolution node, the name resolution node again registers with the DBID owners.

Mapping manager 1008 of virtual node 1002 is configured to process commands for a storage node that are received from name resolution nodes. For instance, mapping manager 1008 may apply the name and timestamp in the received command as a key to directory block map 1010 of virtual node 1002 to determine the entity block to which the command is directed. Then, the command may be executed by virtual node 1002.

Note that a storage node that owns a particular directory block maintains in name resolution node registry 1014 entries for registered nodes per directory name. Name resolution node registry 1014 may have any suitable form, such as being a file. The initial registration for a virtual node is part of the node state, so is recorded in name resolution node registry 1014. An extension for the registration is not recorded in name resolution node registry 1014. When a virtual node is moved to a new physical node, the registration may be extended to the full time possible. For example, after a virtual node loads in a new physical node, the registration may again be provided with the 1-minute lease.

Figure 11:
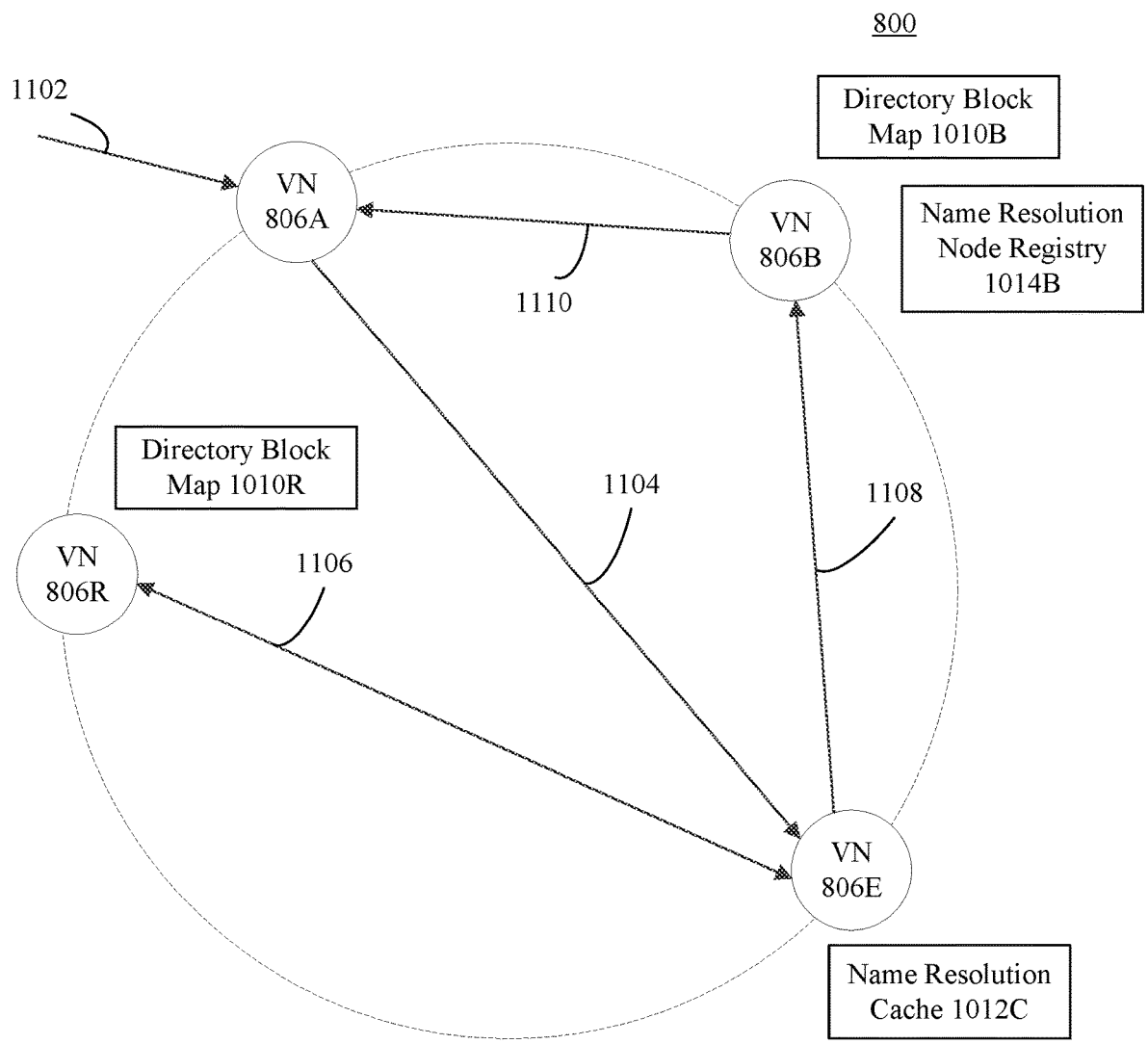
FIG. 11 shows a block diagram of the hierarchical namespace service of FIG. 8, where virtual nodes forward a command to a virtual node that manages an entity block identified in the command, in accordance with an example embodiment.

The processing of an incoming command is described in further detail with respect to FIG. 11. FIG. 11 shows a block diagram of a portion of hierarchical namespace service 800 of FIG. 8, where virtual nodes forward a command to a virtual node that manages an entity block identified in the command, in accordance with an example embodiment. As shown in FIG. 11, hierarchical namespace service 800 includes virtual node 806A, virtual node 806B, virtual node 806E, and a fourth virtual node 806R. A directory block map 1010B and a name resolution node registry 1014B are shown for virtual node 806B, a name resolution cache 1012C is shown for virtual node 806E, and a directory block map 1010R is shown for virtual node 806R. Physical nodes, further virtual nodes, and further directory block maps, name resolution node registries, and name resolution caches are not shown in FIG. 11 for ease of illustration. Note that the communications shown in the form of arrows in FIG. 11 are shown as occurring between virtual nodes but are actually communicated between virtual nodes by the underlying physical nodes (not shown in FIG. 11).

Figure 12:
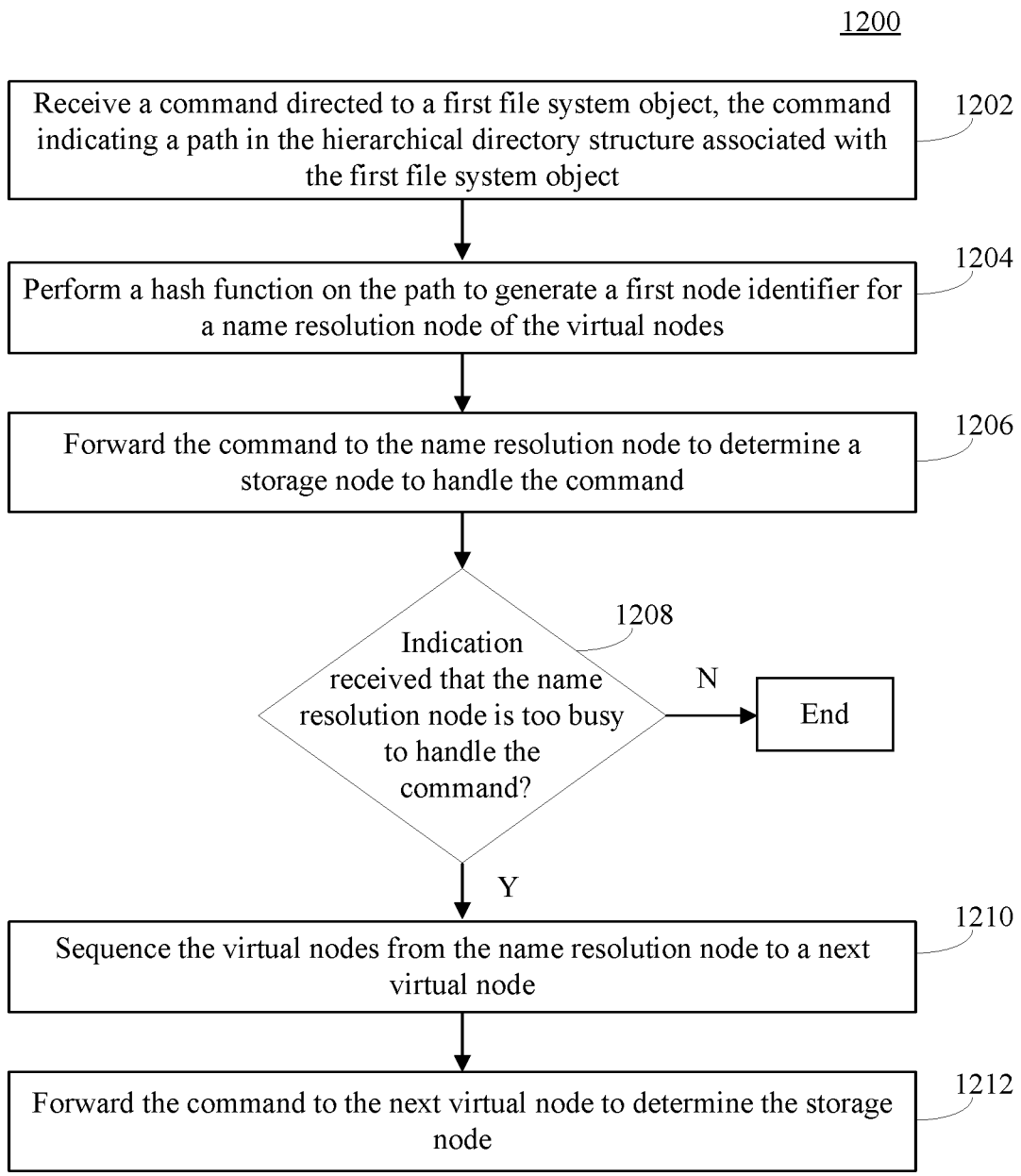
FIG. 12 is a flowchart of a process for a virtual node to forward a received command to another virtual node for name resolution, in accordance with another example embodiment.
Figure 13:
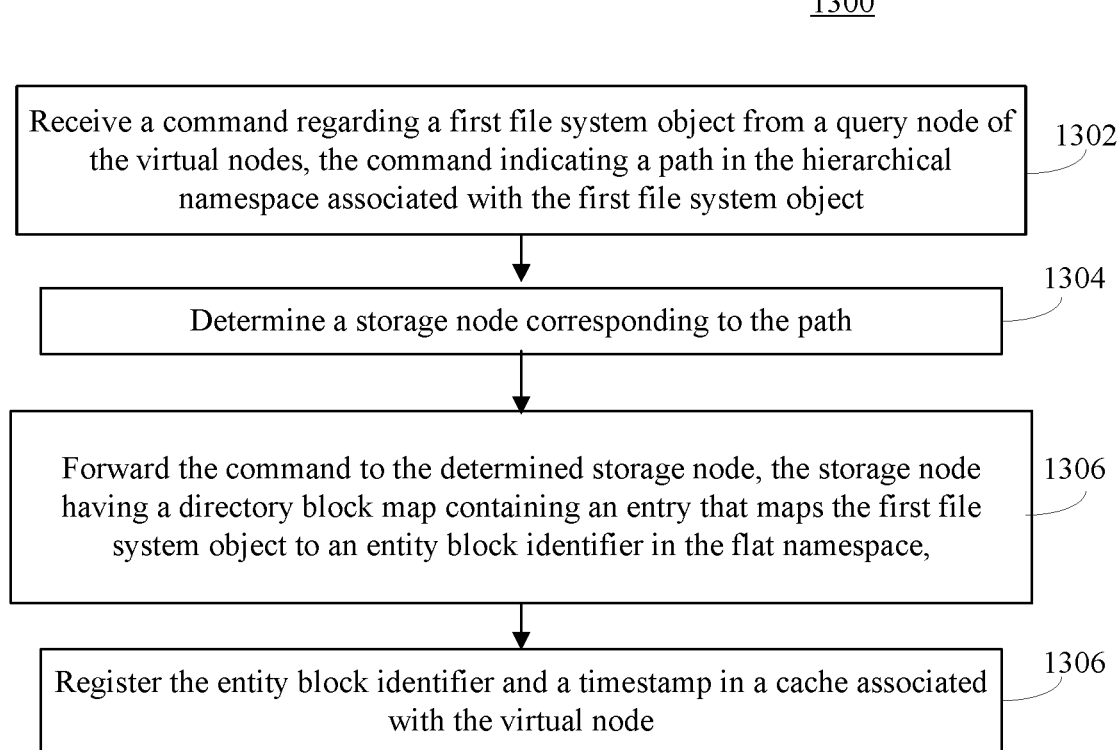
FIG. 13 is a flowchart of a process for a virtual node to perform name resolution on a command to identify and forward the command to another virtual node that manages an entity block identified in the command, in accordance with another example embodiment.
Figure 14:
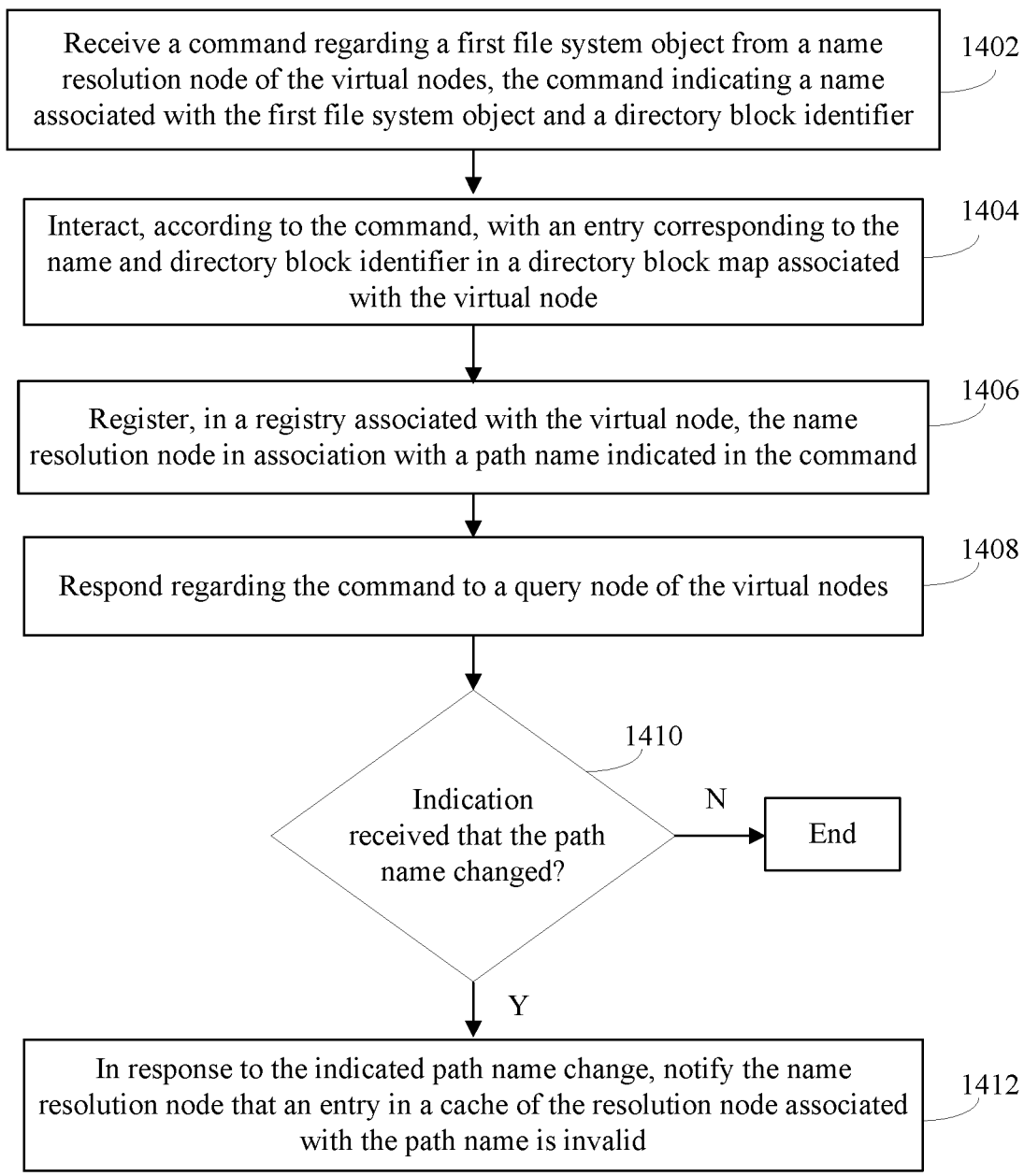
FIG. 14 is a flowchart of a process for a virtual node to execute a received command with regard to an entity block identified in the command, in accordance with another example embodiment.

Hierarchical namespace service 800 of FIG. 11 is described with reference to FIGS. 12-14. FIG. 12 is a flowchart 1200 of a process for a virtual node to forward a received command to another virtual node for name resolution, in accordance with another example embodiment. FIG. 13 is a flowchart 1300 of a process for a virtual node to perform name resolution on a command to identify and forward the command to another virtual node that manages an entity block identified in the command, in accordance with another example embodiment. FIG. 14 is a flowchart 1400 of a process for a virtual node to execute a received command with regard to an entity block identified in the command, in accordance with another example embodiment. Flowcharts 1200, 1300, and 1400, and hierarchical namespace service 800 of FIG. 11 are described as follows.

Flowchart 1200 of FIG. 12 may be performed by a virtual node when operating as a query node as described above. For instance, command forwarder 1004 of virtual node 1002 in FIG. 10 may operate according to flowchart 1200. Note that flowchart 1200 describes a look-up of the name resolution virtual node by hashing a full path (to an entity block) provided in the file system command. In other embodiments, command forwarder 1004 may determine the name resolution node in other ways. For instance, command forwarder 1004 may be additionally (or alternatively) configured to determine the name resolution node based on file system metadata, such as metadata for accounts and file systems. Such file system metadata may include the "root directory" DBID. The front-end layer may look up such account and file system metadata, and pass this information to the hierarchical namespace service, which indicates which virtual node is the name resolution node to direct the name resolution request.

Flowchart 1200 begins with step 1202. In step 1202, a command directed to a first file system object is received, the command indicating a path or directory name in the hierarchical namespace associated with the first file system object. For example, as shown in FIG. 11, virtual node 806A receives an incoming command 1102. Command 1102 may have been initially issued by an application (such as application 220 of FIG. 2) to a storage system (such as storage system 202 of FIG. 2). Command 1102 may include a file system operation directed to an entity block stored in the storage cluster with namespace mapping managed by hierarchical namespace service 800. As such, command 1102 may have been forwarded to hierarchical namespace service 800. A physical node, such as physical node 802A of FIG. 8 may have received and forwarded command 1102 to virtual node 806A. For example, physical node 802A may have selected virtual node 806A of its managed set for receiving command 1102 on any sort of basis, including a rotation of incoming commands among virtual nodes, based on current workload, on a random basis, and/or any other basis.

Command 1102 indicates a target entity block, a hierarchical path name to the entity block, and an operation to perform on the target entity block and may further include an associated timestamp indicating a time of receipt.

In step 1204, a hash function is performed on the path or directory name to generate a first node identifier for a name resolution node of the virtual nodes. In an embodiment, hash generator 1010 of command forwarder 1004 may perform a hash function on the path or directory name of command 1102, such as a CRC64 algorithm or other suitable hash function, to generate a hash result. The hash result identifies the name resolution node. A motivation for this is to send all the requests for resolving the same path name to the same virtual node. If the same virtual node resolves the path name to the DBID, fewer virtual nodes will register for notifications. Furthermore, this approach improves the effectiveness of the name resolution caching as it increases the likelihood of cache hits.

In step 1206, the command is forwarded to the name resolution node to determine a storage node to handle the command. Command forwarder 1004 is configured to forward the received command 1102 to the identified name resolution node. As shown in FIG. 11, virtual node 806A forwards command 1102 to virtual node 806E as forwarded command 1104. Virtual node 806E is identified as the name resolution node by virtual node 806A due to being identified by the hash result. Note that although not shown in FIG. 11, forwarded command 1104 is forwarded to virtual node 806E by one or more physical nodes. For example, with reference to FIGS. 8 and 11, forwarded command 1104 may be forwarded from physical node 802A managing virtual node 806A to physical node 802E managing virtual node 806E.

In step 1208, whether an indication is received that the name resolution node is too busy to handle the command is determined. Note that if virtual node 806E (the name resolution node) is able to handle name resolution of forwarded command 1104, operation of flowchart 1200 ends after step 1206. However, if virtual node 806E is too busy, virtual node 806E may throttle the request, provide an indication of the throttling back to virtual node 806A, and operation proceeds to step 1210.

In step 1210, the virtual nodes are sequenced from the name resolution node to a next virtual node. In an embodiment, virtual node 806A selects another virtual node in hierarchical namespace service 800 to handle name resolution for command 1102. The virtual node may be selected in any manner, including by selecting the next virtual node in a sequence of virtual nodes (e.g., by virtual node identifiers), by selecting the next virtual node randomly, or selecting the next virtual node in another fashion. In an embodiment in which the next virtual node in a sequence is selected, this may be carried out by adding a predefined number (e.g., 1) to an identifier of the previously-selected virtual node to obtain an identifier of the next-selected virtual node. An approach that always selects the same next virtual node will tend to improve the benefits of name resolution caching by increasing the likelihood of cache hits.

In step 1212, the command is forwarded to the next virtual node to determine the storage node. Command forwarder 1004 is configured to forward received command 1102 to the next identified name resolution node as forwarded command 1104. In this manner, the name resolution requests can be distributed across multiple virtual nodes. This allows distributing the load across multiple virtual nodes, and handling the case where we have a busy virtual node managing a directory that stores billions of files, for example.

Note that in an embodiment, command forwarder 1004 of a query node may be implemented as a client library. When the client library sends a command to the name resolution node, the response to the command may be returned to the query node directly from the storage node that executed the command. This minimizes the number of messages sent back and forth. The query node may or may not be clock synchronized with the rest of the virtual nodes of the storage cluster. As such, the client library is configured to manage transaction, but does not execute the commands.

In an embodiment, a query node may implement flowchart 1200 of FIG. 12 according to the following operations: (a) Calculate the CRC64 for the normalized path ("/account/fs/path") provided in the command to find the virtual node that will act as the name resolution node for the command (e.g., the name resolution node=(CRC-PATH % # VNSN); (b) Send the command to the name resolution node and wait for the result from storage node. If the name resolution node responds with a "throttled request," the query node sends the command to the next name resolution node (e.g., name resolution node+1). Sending a command to a same name resolution node can improve the utilization of the caching performed at name resolution nodes, though a command can alternatively be sent to an arbitrary node; and (c) Preserve a timestamp returned from the storage node to be used to calculate a final commit timestamp for the command.

Flowchart 1300 of FIG. 13 is now described. Flowchart 1300 may be performed by a virtual node when operating as a name resolution node as described above. For instance, path resolver 1006 of virtual node 1002 in FIG. 10 may operate according to flowchart 1300.

Flowchart 1300 begins with step 1302. In step 1302, a command regarding a first file system object is received from a query node of the virtual nodes, the command indicating a path or directory name in the hierarchical namespace associated with the first file system object. As shown in FIG. 11, virtual node 806E receives forwarded command 1104 from virtual node 806A operating as a query node.

In step 1304, a storage node corresponding to the path is determined. In an embodiment, path resolver 1006 of virtual node 806E may determine the virtual node managing the DBID corresponding to the path or directory name in forwarded command 1104. As described above, path resolver 1006 may first check name resolution cache 1012 to see if the path or directory name is shown mapped to the DBID (from processing a prior command). If not present there, path resolver 1006 may search for the storage node by processing the path or directory name beginning at the root. As shown in FIG. 11, virtual node 806E may communicate with virtual node 806R that manages the root directory via node resolution communications 1106. Virtual node 806R accesses its directory block map 1010R, which maps the path or directory name in the path name of command 1102 to a GUID and transmits the GUID to virtual node 806E. Path resolver 1006 at virtual node 806E continues working through the path or directory name, portion by portion, communicating with the virtual node managing each path portion to determine the corresponding DBID, until the entire path is traversed, and the storage node is determined. In an embodiment, path resolver 1006 communicates with the physical node that manages virtual node 1002 to determine the virtual node that owns the root directory and each determined GUID. The physical node may have access to master directory block table 700, which includes the mapping of all path portions to GUIDs, including root, and thus can find each virtual node that path resolver 1006 needs to communicate with based on the GUID determined from the prior virtual node. As described above, path resolver 1006 makes the communications with the various virtual nodes through the physical nodes managing them.

In step 1306, the command is forwarded to the determined storage node, the storage node having a directory block map containing an entry that maps the first file system object to an entity block identifier in the flat namespace. Path resolver 1006 is configured to forward the command to the storage node. For example, with reference to FIG. 11, virtual node 806E forwards forwarded command 1104 to virtual node 806B as forwarded command 1108. Virtual node 806B is identified as the storage node by virtual node 806E due to owning the DBID of the command path or directory name. Note that although not shown in FIG. 11, forwarded command 1108 is forwarded to virtual node 806B through one or more physical nodes. For example, with reference to FIGS. 8 and 11, forwarded command 1108 may be forwarded from physical node 802E managing virtual node 806E to physical node 802B managing virtual node 806B.

In step 1308, the entity block identifier and a timestamp are registered in a cache associated with the virtual node. In an embodiment, path resolver 1006 is configured to store the entity block identifier determined for the command in an entry in name resolution cache 1012, along with a timestamp, and the path name of the command. In this manner, when a future command is received that includes the path, path resolver 1006 can determine the storage node merely by reference to the entry in name resolution cache 1012. In an embodiment, path resolver 1006 may receive the entity block identifier from the storage node in a notification message and may store the entry in name resolution cache 1012 in response.

Note that entries in name resolution cache 1012 may timeout, and thus become invalid, after a predetermined amount of time passes from the timestamp value, such as one minute, one hour, or other time period. Furthermore, path resolver 1006 may receive an invalidate cache entry notification from the storage node for the entry in name resolution cache 1012, and in response, may indicate the entry as invalid. Similarly, path resolver 1006 may receive an invalidate cache entry notification from other virtual nodes that path resolver 1006 communicated with to resolve DBIDs for the path portions of the path name in the command, when any of those other virtual nodes determine the path portion they resolved has become invalid (e.g., due to a directory name change, etc.).

Furthermore, although all virtual nodes may be configured to resolve a name to a DBID as a name resolution node, having all virtual nodes performing the name resolution service may create a substantial number of invalidate cache messages for a directory rename command. For that reason, only a subset of the virtual nodes (e.g., 20%) may be enabled for name resolution. In an embodiment, the number of virtual nodes enabled for name resolution can dynamically change based on the ratio of name resolving requests and rename directory requests.

In an embodiment, a name resolution node may implement flowchart 1300 of FIG. 13 according to the following operations (where RS=read sequence number): (a) Transaction.RS=now( )-delta, if Transaction.RS=0; (b) Find in the local name resolution cache the DBID for the path name, such as "/path1/path2/", and Transaction.RS if the file path is "/path1/path2/name". If "/path1/path2" is not in the local name resolution cache, check for the presence of the leading path portion of the path name (e.g., "/path1" and so on) in the name resolution cache, which can be used to determine a DBID for at least a leading portion of the path name; (c) When the mapping between path and DBID is not in the local name resolution cache, send a path resolution request to the virtual node that manages the first portion of the path (e.g., the root virtual node or the virtual node managing a DBID determined for the path leading portion). The path resolving node returns the DBID for Transaction.RS, with the result being valid for RS+X seconds only. When the owner virtual node of the DBID changes the mapping, the owner virtual node notifies all nodes that cached the latest value in their name resolution path and the cached value has not expired; and (d) Send the command to the determined storage node, which owns the EBID to which the command is directed.

Flowchart 1400 of FIG. 14 is now described. Flowchart 1400 may be performed by a virtual node when operating as a storage node as described above. For instance, mapping manager 1008 of virtual node 1002 in FIG. 10 may operate according to flowchart 1400.

Flowchart 1400 begins with step 1402. In step 1402, a command regarding a first file system object is received from a name resolution node of the virtual nodes, the command indicating a name associated with the first file system object and a directory block identifier. As shown in FIG. 11, virtual node 806B receives forwarded command 1108 from virtual node 806E operating as a name resolution node.

In step 1404, an entry corresponding to the name and directory block identifier is interacted with in a directory block map associated with the virtual node according to the command. In an embodiment, mapping manager 1008 may maintain directory block map 1010, which be a table or have other form, that has entries (e.g., rows) corresponding directory blocks. For example, directory block map 1010 may include rows configured similarly to the rows of master directory block table 700. A name entry and directory block identifier (e.g., the GUID determined by the name resolution node for the last path portion) in forwarded command 1108 may be used by mapping manager 1008 as a row key to directory block map 1010 to determine a row with an entity block identifier to which the command is directed.

Mapping manager 1008 may interact with this determined entity block entry in any manner, depending on the type of command. For example, for a get-attributes command, mapping manager 1008 may determine one or more attributes in the entry requested by the command. For a command such as one of set-properties, create-file, delete-file, create-directory, and delete-directory, mapping manager 1008 may create a new entry in directory block map 1010 for a new version of the entity block, with or without attributes copied from the prior entry for the entity block identifier, but with a new commit time, and some attributes potentially modified (e.g., modifying any attributes specified in a set-properties command, setting the delete flag for a delete-file command, etc.).

Note that some commands such as move-file and move-directory may be performed as multiple commands. For example, the move-file command may be implemented by a create-file command and a delete-file command, where the create-file command creates a new entry for the entity block identifier in directory block map 1010 (of the same or a different virtual node, depending on the move destination) for the new directory block, and the delete-file command creates a new entity block identifier in directory block map 1010 (for the same virtual node) with the delete flag set. In such case, the query node may issue two or more commands to name resolution node(s) in sequence to have one or more storage nodes perform the commands to perform the overall command.

Referring back to FIG. 14, in step 1406, the name resolution node and a path name indicated in the command are registered in a registry associated with the virtual node. As described above, in an embodiment, mapping manager 1008 is configured to create an entry in name resolution node registry 1014 that associates the name resolution node (that forwarded the command to the storage node) with the path name in the forwarded command. The entry may further include a timestamp of creation of the entry. This entry in name resolution node registry 1014 enables the name resolution node to be notified in the event that the path name is changed, and thus the name resolution node should invalidate any entries in its name resolution cache 1012C associated with the path name (the full path name or any portion thereof).

In an embodiment, after a predetermined amount of time passes after the timestamp for an entry in name resolution node registry 1014, mapping manager 1008 may stop tracking that entry, and not send a notification to the name resolution node of that entry if the corresponding path becomes changed. This cutoff enables mapping manager 1008 to reduce its tracking load and reduce a number of notifications needing to be sent. The assumption is that the name resolution node will invalidate its own entries in its name resolution cache 1012 after a predetermined amount of time passes, and thus no longer needs the notifications from the storage node.

Referring back to FIG. 14, in step 1408, a query node of the virtual nodes is responded to regarding the command. In an embodiment, after the storage node performs the command in forwarded command 1108, the storage node provides an indication to the query node of the command completion. By responding directly to the query node, rather than responding to the query node through the name resolution node, a number of communication links is reduced.

With reference to the example of FIG. 11, virtual node 806B sends a command completion indication 1110 to virtual node 806A. Virtual node 806A may forward command completion indication 1110 through its physical node (physical node 802A) to the client that issued command. Note that although not shown in FIG. 11, command completion indication 1110 is forwarded to virtual node 806A through one or more physical nodes. For example, with reference to FIGS. 8 and 11, command completion indication 1110 may be sent from physical node 802B managing virtual node 806B to physical node 802A managing virtual node 806A.

The form of the indication of command completion depends on the particular command. For instance, for a get-properties command, the storage node may return the requested attributes. For commands such as set-properties, create-file, delete-file, create-directory, and delete-directory, the storage node may return a commit timestamp for the command.

Note that the storage node may determine the query node to which command completion indication 1110 is to be send in various ways. In one embodiment, command forwarder 1004 inserts an identifier for the query node when forwarding the command to the name resolution node, and the name resolution node forwards the query node identifier to the storage node. In another embodiment, command forwarder 1004 publishes an identifier for the query node in a data structure, such as a memory location, a file, a cache, etc., in association with the command. The data structure is accessible by the storage node to determine the query node associated with the command. In other embodiments, the storage node may determine the query node in other ways.

In step 1410, whether an indication is received that the path name changed is determined. As described above, path names can be changed due to operations such as move-directory, rename-directory, etc., that change any path portion of the path name. Such a path name change adversely impacts entries in name resolution caches for that path name, making them invalid. As such, the storage node monitors for commands containing operations that change path names, which may cause mapping manager 1008 to modify entries in its virtual node's directory block map 1010 regarding the path name, as well as notifying name resolution nodes registered for that path name (in name resolution node registry 1014) of the change.

As such, with reference to FIG. 8, if virtual node 806B (the storage node) receives no indications that the path name associated with forwarded command 1108 has changed, operation of flowchart 1400 ends after step 1410. However, if virtual node 806B receives an indication of a path name change, operation proceeds to step 1412.

In step 1412, notify the name resolution node that an entry in a cache of the resolution node associated with the path name is invalid in response to the indicated path name change. With reference to FIG. 11, virtual node 806B may modify directory block map 1010B according to the path name change (e.g., in a received command), and check name resolution node registry 1014B for name resolution nodes with entries associated with the path name, including virtual node 806E. Virtual node 806B transmits a notification to virtual node 806E of the path name change, which informs virtual node 806E to invalidate any entries in name resolution cache 1012C associated with the path name.

In an embodiment, a storage node may implement flowchart 1400 of FIG. 14 according to the following operations, for an example create-file command (where CS=commit sequence number): (a) Receive command Create-File for specified DBID and name, for example, "name"; (b) OCT1=now( ); Local commit timestamp; (c) Find an entry containing "name" for the specified DBID. First check for the name "name" in the local directory block map, and if not there, check the local name resolution node registry, or the master directory block table 700 (managed by the physical nodes); (d) If the last value for the entry is not indicated as deleted, abort the command; (e) Introduce a new entry for a new version for "name" with a state of Prepare and CS=OCT1, or abort transaction if: there is no transaction modifying "name" that has not committed yet and/or there is no transaction that started after Transaction.RS and has already committed; (f) Write the update to the name resolution node registry; (g) set OCT2=now( ); and (H) Return OCT2 as proposed commit timestamp to the query node.

Note that in an embodiment, mapping manager 1008 may further be configured to respond to the path name resolving requests received from path resolver 1006 at virtual nodes performing name resolution. For instance, mapping manager 1008 may receive a path portion from the name resolution, may search its virtual node's directory block map 1010 for the path portion (in name column 704), and return to the resolution node the corresponding DBID for that path portion. Virtual node 806R of FIG. 11, which manages the root directory, is described above as operating as a path resolving node for virtual node 806E functioning as the name resolution node, via node resolution communications 1106.

Accordingly, embodiments provide many advantages, including enabling file system operations to be performed on entity blocks by manipulating data in directory block maps rather than necessarily operating on the stored file system objects themselves. For example, as described above, a file system object in the hierarchical namespace may be identified at least by a path and a name. The path may be changed for the file system object in the hierarchical namespace. In embodiments, the path change causes a modification to an entry in at least one directory block map for an entity block identifier of an entity block corresponding to the file system object. The change in the directory block map(s) accounts for the path change, and therefore, the change does not cause a file or folder corresponding to the entity block to be moved in storage of the storage system. Changing an entry in a directory block map is a much less costly operation than actually moving files and/or folders in storage. This is particularly true when the entity block is a folder containing many files. If the folder is moved, this would lead to many move file operations for the contained files (with each move entailing a delete-file and a create-file operation). Embodiments avoid moving stored file system objects by instead making changes in data block maps.

B. Example Embodiments for Load Balancing

As described above, namespace 104 of FIG. 1 may include physical nodes and virtual nodes. They physical nodes may manage the virtual nodes, thereby enabling communications between the virtual nodes for command mapping. Furthermore, the physical nodes may be configured to perform load balancing between physical nodes and virtual nodes.

Figure 15:
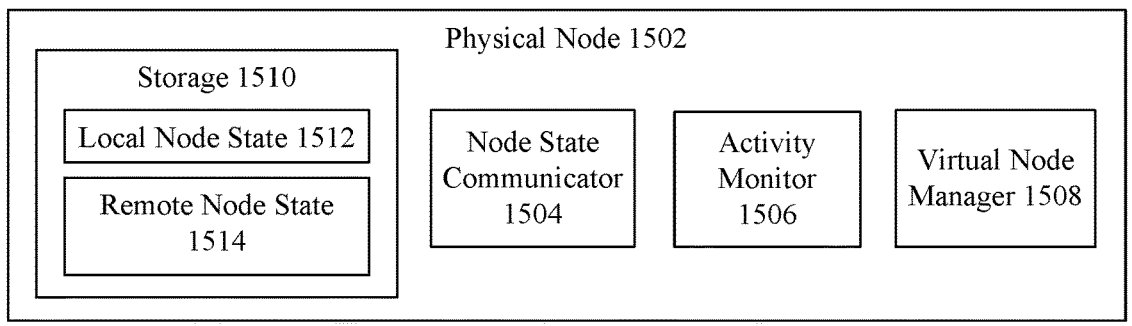
FIG. 15 shows a block diagram of a physical node, in accordance with an example embodiment.

Physical nodes may be implemented in various ways to enable such load balancing. For instance, FIG. 15 shows a block diagram of a physical node 1502, in accordance with an example embodiment. Physical nodes 802A-802E of FIG. 8 may be implemented according to physical node 1502, in an embodiment. As shown in FIG. 15, physical node 1502 includes a node state communicator 1504, a virtual node Manager 1508, an activity monitor 1506, and storage 1510. These features of physical node 1502 are further described as follows.

Node state communicator 1504 is configured to enable physical node 1502 to transmit information to other physical nodes, including state information regarding physical node 1502, and in some cases, the state information of other nodes. Furthermore, node state communicator 1504 enables physical node 1502 to receive state information regarding other physical nodes. Such communication of state information enables physical node 1502 to determine a load carried by other physical nodes, as well as to inform those other physical nodes about the load carried by physical node 1502, which may be used to determine whether load balancing may be desired.

Any type and amount of node state information regarding physical node 1502 may be determined and transmitted to other physical nodes, as well as being received from the other physical nodes. For example, the following node state information regarding physical node 1502 may be determined/tracked and provided to other physical nodes:

Note generation state indicating a boot time of the physical node (e.g., an integer);

Node heartbeat indicating the last heartbeat of the physical node (e.g., an integer); and Other state information provided in the form of a key-value pair and version of the value (e.g., in the form of {<state-id, value, version>}).

Examples of such other state information include state keys such as:

Node State (e.g., Booting, Normal, Leaving, or Left);
CPU load (e.g., slow, medium, or fast on average);
Memory load (e.g., 1, 3, or 9-minute average);
QPS (queries per second) (e.g., 1, 3, or 9-minute average);
Number of managed directory blocks; and
Top X number of directory blocks ordered by management directory block cost (e.g., CPU/Memory/Net) (e.g., having the greatest number of directory block map entries).

Note that the example averages mentioned above are exponential moving averages (EMAs).

In an embodiment, the above and/or other node state information for physical node 1502 may be stored in storage 1510 as local node state 1512. Furthermore, node state information maintained by physical node 1502 for other nodes may be stored in storage 1510 as remote node state 1514. Storage 1510, and/or other storage used elsewhere in the storage systems disclosed herein, may include one or more of any type of physical storage mechanism, including a magnetic disc (e.g., in a hard disk drive), a solid state drive (SSD), an optical disc (e.g., in an optical disk drive), a magnetic tape (e.g., in a tape drive), a memory device such as a RAM (random access memory) device such as a nonvolatile RAM (NVRAM), and/or any other suitable type of physical storage device. Note that in another embodiment, physical node 1502 (and other physical nodes of the namespace service) may store local node state 1512 and/or remote node state 1514 elsewhere, such as in storage maintained by the physical layer of the storage cluster.

Activity monitor 1506 is configured to analyze local node state 1512 and remote node state 1514 to determine whether physical node 1502 is overloaded and/or whether any other physical nodes of the namespace service are overloaded. For example, activity monitor 1506 may compare local node state values and/or remote node state values against corresponding threshold values to determine whether a particular physical node appears to be overloaded or underutilized. For example, a CPU load over 70%, or indicated as "fast", may be an indication the corresponding physical node is overloaded. In contrast, a CPU load of under 50%, or indicated as "slow" may be an indication the corresponding physical node is underutilized. Additionally, or alternatively, activity monitor 1506 may rank particular state values for all physical nodes to determine the busiest, and potentially overloaded, physical nodes, as well as the least busy, and potentially underutilized, physical nodes. Activity monitor 1506 can similarly analyze local node state 1512 and remote node state 1514 to determine whether any particular virtual node manages a directory block that is overloaded (e.g., contains very large numbers of files).

Note that activity monitor 1506 may not be present in all physical nodes, or may not be activated in all physical nodes. Instead, activity monitor 1506 may be active in a predetermined subset of the physical nodes in a namespace identified as "super nodes." Super nodes may be a relatively small number of the physical nodes, such as in the range of 5-10 physical nodes out of one thousand. Super nodes may be distributed across upgrade and failure domains of a storage cluster such that there are enough physical nodes during an upgrade or a failure. The super nodes may form a cluster management ring, with the task of keeping critical portions of the storage cluster state running for every important change of the cluster state, including the mapping between virtual nodes and physical nodes. In an embodiment, super nodes may be required to form a consensus before implementing changes to a namespace service, such as transfer-ring virtual node between physical nodes. The super nodes may have a designated primary super node. The primary super node may track and perform the load balancing for the storage cluster. Furthermore, the primary super node may play the role of a seeding node for the gossip protocol (as further described below). Super nodes may use well defined names that each physical node knows about. If a physical node has a question about the state of another physical node, the physical node can request the latest state from a super node. However, typically, the physical node can obtain state information from other physical nodes according to the gossip protocol.

Virtual node manager 1508 is configured to perform load balancing within the namespace service based on the determinations made by activity monitor 1506, taking into account whether physical node 1502 is considered a super node. For physical nodes determined as overburdened, virtual node manager 1508 may instruct the overburdened physical node to transfer one of its managed virtual nodes to a less burdened (e.g., underutilized) physical node (which may require a consensus with other super nodes). Alternatively, for a virtual node determined as overburdened due to having a very busy directory block, virtual node manager 1508 may instruct the virtual node to split the directory block.

Figure 16:
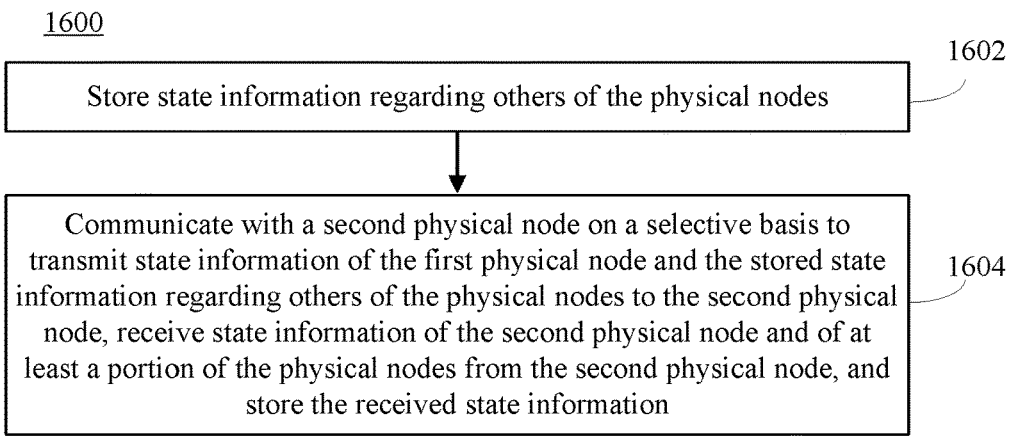
FIG. 16 is a flowchart of a process for communicating state information between physical nodes, in accordance with another example embodiment.

Node state communicator 1504 may be configured in communicate state information with other nodes in various ways. For instance, FIG. 16 is a flowchart 1600 of a process for communicating state information between physical nodes, in accordance with another example embodiment. In an embodiment, node state communicator 1504 may be configured to operate according to flowchart 1600. Flowchart 1600 and node state communicator 1504 are described as follows.

In step 1602 of flowchart 1600, state information is stored regarding others of the physical nodes. For example, as described above, local node state 1512 may be stored in storage 1512 that is node state information regarding physical node 1502. Furthermore, storage 1512 may store remote node state 1514, which includes node state information for one or more other physical nodes of the namespace service. Such node state information may be received from other physical nodes according to prior iterations of step 1604, which is described as follows.

In step 1604, a second physical node is communicated with on a selective basis to transmit state information of the first physical node and the stored state information regarding others of the physical nodes to the second physical node, receive state information of the second physical node and of at least a portion of the physical nodes from the second physical node, and store the received state information. In embodiments, node state communicator 1504 may communicate with one or more other physical nodes in a namespace service to provide local node state 1512 to those physical nodes. Furthermore, node state communicator 1504 may receive node state information regarding those physical nodes from those physical nodes, and may store the received node state information as remote node state 1514. For example, with reference to FIG. 8, virtual node 806A may transmit its local node state information to virtual nodes 806B and 806E, and may receive and store remote node state information from virtual nodes 806B and 806E. Node state communicator 1504 may be configured to conduct such communications with other physical nodes in any manner, including in the form of HTTP calls, API calls, web service calls, etc. Furthermore, such communications may be conducted according to any protocol.

For instance, in an embodiment, node state communicator 1504 may communicate with the other physical nodes according to a gossip protocol. One example applicable gossip protocol is called Apache Gossip™ implemented by Apache Cassandra™ developed by The Apache Software Foundation (ASF).

In an embodiment of the gossip protocol, each physical node may maintain information about the state of every other physical node in a storage cluster. Once every X milliseconds (e.g., 1000 ms), each physical node randomly chooses a predetermined number (e.g., three) of other physical nodes with which to exchange state information. With some probability, one of the 3 nodes may have been online in the past, but is not available at that time. Likewise, with some probability, one of the 3 nodes may be a super node. When two physical nodes connect, they exchange information about the state of all nodes in the cluster. When a super node suspects a physical node to be down, the super node may attempt to assign the virtual nodes of the physical node to a different physical node, which may be an existing physical node or a newly added physical node to the storage cluster. If the physical node succeeds in taking on the virtual nodes, the physical node communicates the new assignment to the other physical nodes using the gossip protocol. Super nodes may receive gossip protocol messages with higher probability than non-super physical nodes, so may receive state information regarding a physical node that is down in a few rounds of communications.

Figure 17:
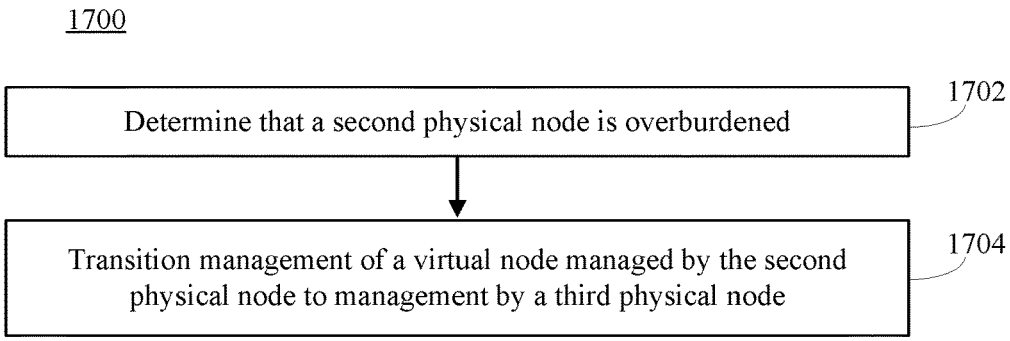
FIG. 17 is a flowchart of a process for load balancing of physical nodes, in accordance with another example embodiment.

Physical node 1502 may be configured to perform load balancing for physical nodes in various ways. For instance, FIG. 17 is a flowchart 1700 of a process for load balancing of physical nodes, in accordance with another example embodiment. In an embodiment, physical node 1502 may be configured to operate according to flowchart 1700. Flowchart 1700 and physical node 1502 are described as follows.

In step 1702 of flowchart 1700, a second physical node is determined to be overburdened. For example, as described above, activity monitor 1506 is configured to analyze local node state 1512 and remote node state 1514 to determine whether physical node 1502 is overloaded and/or whether any other physical nodes of the namespace service are overloaded. Activity monitor 1506 can make this determination in any suitable manner using algorithms or rules, including comparing local node state values and/or remote node state values against corresponding threshold values, ranking particular state values for all physical nodes, etc. Furthermore, for a physical node determined to be overburdened, or the most burdened, activity monitor 1506 may analyze remote node state 1514 to determine the busiest virtual node of that physical node. For instance, activity monitor 1506 may analyze the top X (e.g., five) number of directory blocks ordered by management cost (e.g., CPU/Memory/Net), as indicated for the physical node in collected remote node state 1514. Activity monitor 1506 determine the virtual node of the physical node that manages the highest cost directory block to be overburdened.

In embodiments, activity monitor 1506 may search for overburdened physical nodes at any desired point of time, including on a periodic basis, on a random basis, etc. For instance, every few seconds, activity monitor 1506 of a primary super node may execute one or more rules against the node state information, and based thereon, may decide to rebalance the distribution of virtual nodes across physical nodes.

In step 1704, management of a virtual node managed by the second physical node is transitioned to management by a third physical node. As described above, virtual node manager 1508 is configured to perform load balancing within the namespace service based on the determinations made by activity monitor 1506. For physical nodes determined as overburdened, virtual node manager 1508 may instruct the overburdened physical node to transfer one of its managed virtual nodes to a less burdened (e.g., underutilized) physical node (which may require a consensus with other super nodes).

For example, with reference to FIG. 8, activity monitor 1506 of physical node 802C (which may be a super node) may determine that physical node 802A is overburdened. Activity monitor 1506 may further determine virtual node 806A as the appropriate virtual node to be transferred, and physical node 802B to be the appropriate physical node to receive the transferred virtual node. Accordingly, activity monitor 1506 of physical node 802C may instruct physical node 802A to transfer virtual node 806A to physical node 802B, and for physical node 802B to take ownership of virtual node 806A.

In such an example, in response to the instruction, physical node 802A may unload virtual node 806A and send a gossip message to other physical nodes and/or the super nodes of hierarchical namespace service 800 that physical node 802A no longer manages virtual node 806A. Physical node 802B, in turn, loads virtual node 806A and sends a gossip message to other physical nodes and/or the super nodes that physical node 802B now manages virtual node 806A Note that if the transition does not complete properly, a subsequent round of gossip protocol communications between the physical nodes will discover that virtual node 806A is not assigned to any physical node. As such, the super nodes will assign virtual node 806A to a new physical node as owner, once the lease expires.

Figure 18:
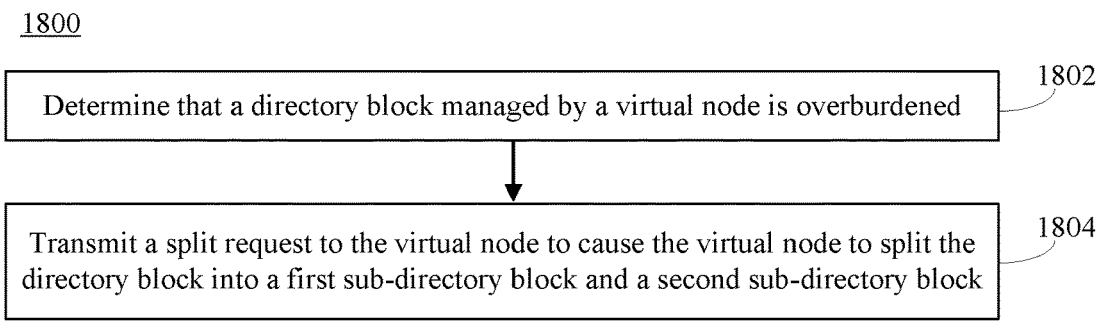
FIG. 18 is a flowchart of a process for load balancing of directory blocks, in accordance with another example embodiment.

Physical node 1502 may be configured to perform load balancing in further ways. FIG. 18 is a flowchart 1800 of a process for load balancing of directory blocks, in accordance with another example embodiment. In an embodiment, physical node 1502 may be configured to operate according to flowchart 1800. Flowchart 1800 and physical node 1502 are described as follows.

In step 1802 of flowchart 1800, a directory block managed by a virtual node is determined to be overburdened. For example, as described above, activity monitor 1506 is configured to analyze local node state 1512 and remote node state 1514 to determine whether physical node 1502 has any overloaded directory blocks and/or whether any other physical nodes of the namespace service have overloaded directory blocks. Activity monitor 1506 can make this determination in any suitable manner using algorithms or rules, including by analyzing the top X (e.g., five) number of directory blocks ordered by management cost (e.g., CPU/Memory/Net), as indicated for physical nodes in collected remote node state 1514. Activity monitor 1506 may determines the directory block having the highest cost as overburdened, particularly if the cost exceeds a predetermined threshold value.

As described above, in embodiments, activity monitor 1506 may search for overburdened directory nodes at any desired point of time, including on a periodic basis, on a random basis, etc.

In step 1804, a split request is transmitted to the virtual node to cause the virtual node to split the directory block into a first sub-directory block and a second sub-directory block. In an embodiment, virtual node manager 1508 may instruct the virtual node to split the directory block determined in step 1802 as overburdened.

In embodiments, splitting and merging directory blocks may be rare operations, but if a client loads a directory block with an excessive number of files/folders, it may be desirable to split the directory block. Splitting a directory block does not affect directory block data in master directory block table 700. In particular, the original directory block is split into a first sub-directory block that maintains the DBID of the split directory block, and a second sub-directory block that is still addressable by the DBID of the original directory block. Note that a split command may direct a virtual node to split the directory block into any number N of virtual nodes, where N is equal to or greater than 2. The original (first sub-) directory block and the second (and any subsequent) sub-directory blocks continue to use the DBID of the original directory block. The original directory block stores the ranges and the EBIDs of the sub directory blocks after the split. The second and any additional sub-directory blocks keeps in "." information about the range they are responsible and the EBID of the original directory block. Table 2 below shows an example of master directory block table 700 with an indication of a split directory block, where the directory is split into two sub-directory blocks (the delete and file columns are not shown for brevity):

TABLE 2

| | DBID | Name | CT | EBID | EBID2 | EBID-Range |
|---|---|---|---|---|---|---|
| 1 | GUID-ROOT | . | 00001 | GUID-FILE1 | | |
| 2 | GUID-ROOT | path1 | 00100 | GUID-PATH1 | | |
| 3 | GUID-ROOT | path2 | 00500 | GUID-PATH2 | | [−inf, "file2") −> GUID-PATH2 ["file2", +inf) −> GUID-NEW |
| 4 | GUID-PATH1 | . | 00100 | GUID-FILE2 | | |
| 5 | GUID-PATH2 | . | 00200 | GUID-FILE3 | | |
| 6 | GUID-PATH2 | file1 | 00300 | GUID-FILE4 | | |
| 7 | GUID-PATH2 | file1 | 00350 | GUID-FILE4 | | |
| 8 | GUID-PATH2 | file1 | 00400 | GUID-FILE4 | | |
| 9 | GUID-PATH2 | path3 | 00400 | GUID-PATH3 | | |
| 10 | GUID-NEW | . | 00500 | GUID-FILE16 | GUID-PATH2 | |
| 11 | GUID-PATH3 | . | 00400 | GUID-FILE14 | | |
| 12 | GUID-PATH3 | file3 | 00401 | GUID-FILE15 | | |

In particular, EBID2 and EBID-Range columns are present, and a new row entry for the new sub-directory is added that is for a new partition (that may be assigned to a different virtual node). The GUID for the new directory block for the sub-directory is indicated as GUID-NEW. The row entry for the original directory block indicates ranges for the split directory and the new directory.

In an embodiment, virtual node manager 1508 may perform a directory block split function as follows: (a) Create new directory block (GUID-NEW); (b) Modify parent directory block's EBID-Range column with new ranges; (c) The next write operation based on the "name" will go to the new or to the old owner; (d) Notify all registered nodes that name resolution cache entries for this DBID are invalid; (e) When the background writer get the point where the split happens, the background writer modifies the previous record to use the new split. Until then, the read operations must go to the original virtual node until the mapping is updated across virtual nodes. Then, subsequent commands are sent to the virtual nodes based on the new mapping. In a similar manner, any number of directory blocks may be merged by virtual node manager 1508 using a merge command. For example, a merge command may be used to merge two or more underutilized directory blocks.

III. Example Computer System Implementation

Namespace service 104, storage system 202, location service 204, DNS 206, storage clusters 208A and 208B, front end layers 210A and 210B, partition layers 212A and 212B, stream layers 214A and 214B, namespace services 216A and 216B, computing device 218, master table service 602, physical nodes 604, virtual nodes 606, physical nodes 802A-802E, virtual nodes 806A, 806B, 806E, and 806R, virtual node 1002, command forwarder 1004, path resolver 1006, mapping manager 1008, hash generator 1010, physical node 1502, node state communicator 1504, activity monitor 1506, virtual node manager 1508, flowchart 900, flowchart 1200, flowchart 1300, flowchart 1400, flowchart 1600, flowchart 1700, and flowchart 1800 may be implemented in hardware, or hardware combined with one or both of software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For instance, in an embodiment, one or more of namespace service 104, location service 204, DNS 206, front end layers 210A and 210B, partition layers 212A and 212B, stream layers 214A and 214B, namespace services 216A and 216B, computing device 218, master table service 602, physical nodes 604, virtual nodes 606, physical nodes 802A-802E, virtual nodes 806A, 806B, 806E, and 806R, virtual node 1002, command forwarder 1004, path resolver 1006, mapping manager 1008, hash generator 1010, physical node 1502, node state communicator 1504, activity monitor 1506, virtual node manager 1508, flowchart 900, flowchart 1200, flowchart 1300, flowchart 1400, flowchart 1600, flowchart 1700, and/or flowchart 1800 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. Note that electronic circuits such as ASICS and FPGAs may be used to accelerate various computations such as checksums, hashing, encryption, compression, etc.

Figure 19:
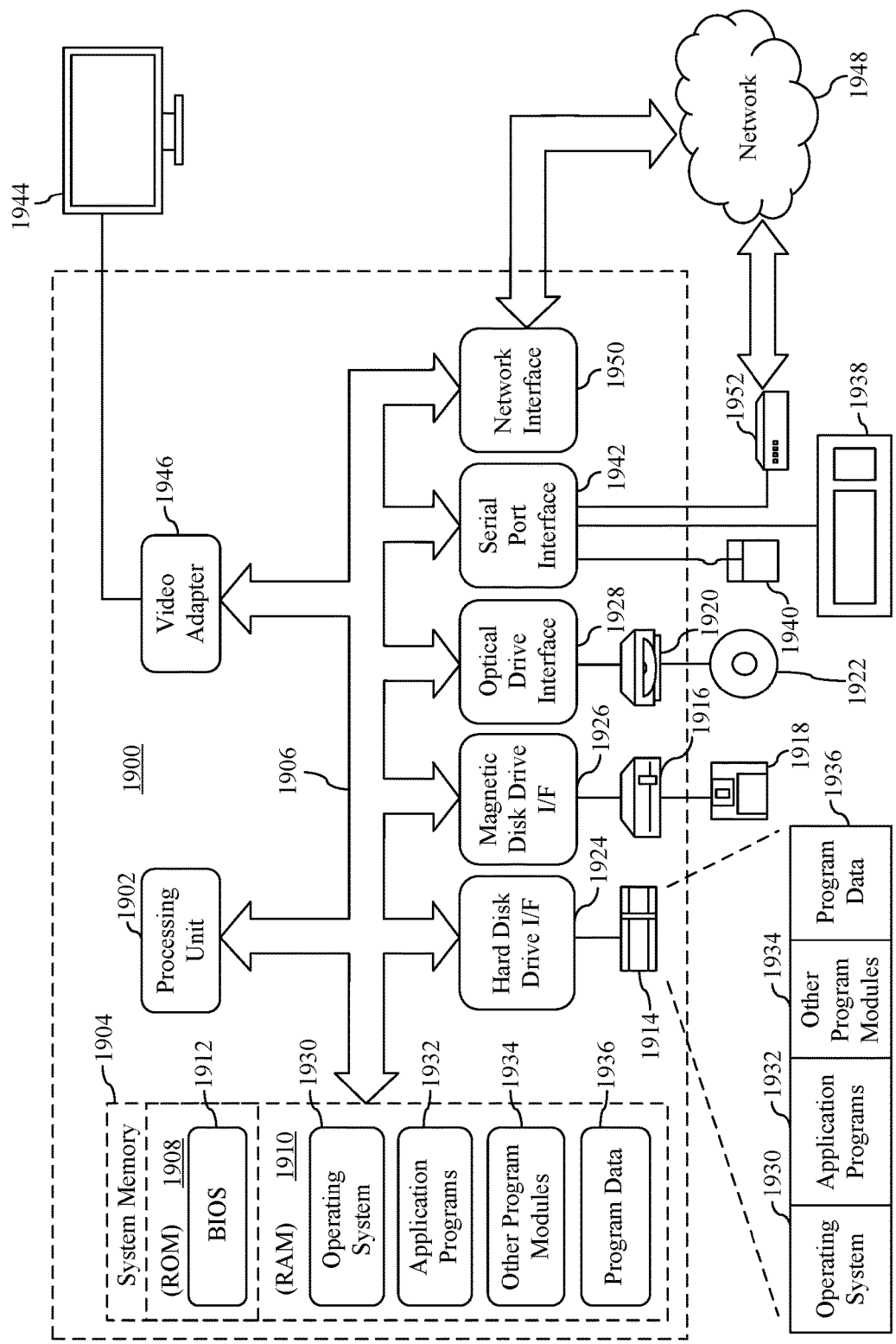
FIG. 19 depicts an example processor-based computer system that may be used to implement various embodiments described herein.

FIG. 19 depicts an example processor-based computer system 1900 that may be used to implement various embodiments described herein, including computing device 218, location service 204, DNS 206, physical nodes 604, 802A-802E, and 1502, etc. System 1900 may also be used to implement any or all the steps of flowcharts 900, 1200, 1300, 1400, 1600, 1700, and 1800. The description of system 1900 provided herein is provided for purposes of illustration, and is not intended to be limiting. Embodiments may be implemented in further types of computer systems, as would be known to persons skilled in the relevant art(s).

As shown in FIG. 19, system 1900 includes a processing unit 1902, a system memory 1904, and a bus 1906 that couples various system components including system memory 1904 to processing unit 1902. Processing unit 1902 may comprise one or more microprocessors or microprocessor cores. Bus 1906 represents one or more of any of several types of bus structures, including a memory bus or memory controller, a peripheral bus, an accelerated graphics port, and a processor or local bus using any of a variety of bus architectures. System memory 1904 includes read only memory (ROM) 1908 and random-access memory (RAM) 1910. A basic input/output system 1912 (BIOS) is stored in ROM 1908.

System 1900 also has one or more of the following drives: a hard disk drive 1914 for reading from and writing to a hard disk, a magnetic disk drive 1916 for reading from or writing to a removable magnetic disk 1918, and an optical disk drive 1920 for reading from or writing to a removable optical disk 1922 such as a CD ROM, DVD ROM, BLU-RAY™ disk or other optical media. Hard disk drive 1914, magnetic disk drive 1916, and optical disk drive 1920 are connected to bus 1906 by a hard disk drive interface 1924, a magnetic disk drive interface 1926, and an optical drive interface 1928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk, magnetic disk, optical disk, ROM, or RAM. These program modules include an operating system 1930, one or more application programs 1932, other program modules 1934, and program data 1936. In accordance with various embodiments, the program modules may include computer program logic that is executable by processing unit 1902 to perform any or all the functions and features of system 100 of FIG. 1 and system 300 of FIG. 3 as described above. The program modules may also include computer program logic that, when executed by processing unit 1902, implement namespace service 104, location service 204, DNS 206, front end layers 210A and 210B, partition layers 212A and 212B, stream layers 214A and 214B, namespace services 216A and 216B, computing device 218, master table service 602, virtual nodes 606, virtual nodes 806A, 806B, 806E, and 806R, virtual node 1002, command forwarder 1004, path resolver 1006, mapping manager 1008, hash generator 1010, node state communicator 1504, activity monitor 1506, virtual node manager 1508, flowchart 900, flowchart 1200, flowchart 1300, flowchart 1400, flowchart 1600, flowchart 1700, and/or flowchart 1800 (and any one or more steps of flowcharts 900, 1200, 1300, 1400, 1600, 1700, and 1800).

A user may enter commands and information into system 1900 through input devices such as a keyboard 1938 and a pointing device 1940. Other input devices (not shown) may include a microphone, joystick, game controller, scanner, or the like. In one embodiment, a touch screen is provided in conjunction with a display 1944 to allow a user to provide user input via the application of a touch (as by a finger or stylus for example) to one or more points on the touch screen. These and other input devices are often connected to processing unit 1902 through a serial port interface 1942 that is coupled to bus 1906, but may be connected by other interfaces, such as a parallel port, game port, or a universal serial bus (USB). Such interfaces may be wired or wireless interfaces.

A display 1944 is also connected to bus 1906 via an interface, such as a video adapter 1946. In addition to display 1944, system 1900 may include other peripheral output devices (not shown) such as speakers and printers.

System 1900 is connected to a network 1948 (e.g., a local area network or wide area network such as the Internet) through a network interface or adapter 1950, a modem 1952, or other suitable means for establishing communications over the network. Modem 1952, which may be internal or external, is connected to bus 1906 via serial port interface 1942. As used herein, the terms "computer program medium," "computer-readable medium," and "computer-readable storage medium" are used to generally refer to memory devices or storage structures such as the hard disk associated with hard disk drive 1914, removable magnetic disk 1918, removable optical disk 1922, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1932 and other program modules 1934) may be stored on the hard disk, magnetic disk, optical disk, ROM, or RAM. Such computer programs may also be received via network interface 1950, serial port interface 1942, or any other interface type. Such computer programs, when executed or loaded by an application, enable system 1900 to implement features of embodiments of the present methods and systems described herein. Accordingly, such computer programs represent controllers of the system 1900.

Embodiments are also directed to computer program products comprising software stored on any computer useable medium. Such software, when executed in one or more data processing devices, causes a data processing device(s) to operate as described herein. Embodiments of the present methods and systems employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

IV. Additional Exemplary Embodiments

In an embodiment, a storage system comprises: a physical node in a plurality of physical nodes; and a set of virtual nodes in a plurality of sets of virtual nodes, the set of virtual nodes managed by the physical node, each virtual node configured to manage a respective set of directory blocks, wherein each directory block is a respective partition of a flat namespace, and is managed by a corresponding single virtual node, and each virtual node maintains a directory block map that maps file system object names in a hierarchical namespace to entity block identifiers in the flat namespace for entity blocks stored in directories corresponding to the managed set of directory blocks.

In an embodiment, an entity block corresponding to an entity block identifier is a file or a folder.

In an embodiment, a file system object in the hierarchical namespace is identified at least by a path and a name; and wherein a change made to the path of the file system object in the hierarchical namespace causes a modification to an entry in at least one directory block map for an entity block identifier of an entity block corresponding to the file system object, without the change causing a file or folder corresponding to the entity block to be moved in storage of the storage system.

In an embodiment, each virtual node comprises: a command forwarder configured to receive a command directed to a first file system object, the command indicating a path in the hierarchical namespace associated with the first file system object, perform a hash function on the path to generate a first node identifier for a name resolution node of the virtual nodes, and forward the command to the name resolution node to determine a storage node to handle the command.

In an embodiment, the command forwarder is further configured to: receive an indication that the name resolution node is too busy to handle the command; sequence the virtual nodes from the name resolution node to a next virtual node; and forward the command to the next virtual node to determine the storage node.

In an embodiment, each virtual node comprises: a path resolver configured to receive a command regarding a first file system object from a query node of the virtual nodes, the command indicating a path in the hierarchical namespace associated with the first file system object, determine a storage node corresponding to the path; forward the command to the determined storage node, the storage node having a directory block map containing an entry that maps the first file system object to an entity block identifier in the flat namespace, and register the entity block identifier and a timestamp in a cache associated with the virtual node.

In an embodiment, each virtual node comprises: a mapping manager configured to receive a command regarding a first file system object from a name resolution node of the virtual nodes, the command indicating a name associated with the first file system object and a directory block identifier, interact, according to the command, with an entry corresponding to the name and the directory block identifier in a directory block map associated with the virtual node, register, in a registry associated with the virtual node, the name resolution node in association with a path name indicated in the command; and respond regarding the command to a query node of the virtual nodes.

In an embodiment, the mapping manager is further configured to: receive an indication the path name changed; and in response to the indicated path name change, notify the name resolution node that an entry in a cache of the resolution node associated with the path name is invalid.

In an embodiment, the physical node comprises: a virtual node manager configured to increase a horizontal scale of the storage namespace, the virtual node generator configured to generate an additional virtual node corresponding to an additional set of directory blocks, and add the additional virtual node to a set of virtual nodes managed by a physical node.

In an embodiment, the physical node comprises: an activity monitor configured to determine that a second physical node is overburdened, and a virtual node manager configured to transition management of a virtual node managed by the second physical node to management by a third physical node.

In an embodiment, the third physical node is an additional node added to the physical nodes to increase horizontal scale of the physical nodes and to manage at least the second physical node.

In an embodiment, the first physical node is configured to share workload information with others of the physical nodes according to a gossip protocol; wherein the first physical node comprises a node state communicator configured to: store state information regarding others of the physical nodes; and communicate with a second physical node on a selective basis to transmit state information of the physical node and the stored state information regarding others of the physical nodes to the second physical node, receive state information of the second physical node and of at least a portion of the physical nodes from the second physical node, and store the received state information.

In an embodiment, the state information of the first physical node includes at least one of: an operational state of the first physical node; a central processing unit (CPU) load of the first physical node; a memory load of the first physical node; a queries per second (QPS) of the first physical node; a number of managed directory blocks managed by the first physical node; or an identification of one or more directory blocks having a highest management cost of directory blocks managed by the first physical node.

In an embodiment, the physical node includes an activity monitor configured to determine that a directory block managed by a virtual node is overburdened, and a virtual node manager configured to transmit a split request to the virtual node to cause the virtual node to split the directory block into a first sub-directory block and a second sub-directory block.

In another embodiment, a method in a storage system comprises: executing a plurality of physical nodes; executing a plurality of sets of virtual nodes; managing each set of virtual nodes with a corresponding physical node; managing, by each virtual node, a respective set of directory blocks, wherein each directory block is a respective partition of a storage namespace and is managed by a corresponding single virtual node; and maintaining, by each virtual node, a directory block map that maps file system object names in a hierarchical namespace to entity block identifiers in the flat namespace for entity blocks stored in directories corresponding to the managed set of directory blocks.

In an embodiment, the method further comprises, in a virtual node: receiving a command regarding a first file system object from a name resolution node of the virtual nodes, the command indicating a name associated with the first file system object and a directory block identifier, interacting, according to the command, with an entry corresponding to the name and the directory block identifier in a directory block map associated with the virtual node, registering, in a registry associated with the virtual node, the name resolution node in association with a path name indicated in the command; and responding regarding the command to a query node of the virtual nodes.

In an embodiment, the method further comprises, in a virtual node: receiving an indication the path name changed; and in response to the indicated path name change, notifying the name resolution node that an entry in a cache of the resolution node associated with path name is invalid.

In an embodiment, the method further comprises, in a first physical node: determining that a second physical node is overburdened; and transitioning management of a virtual node managed by the second physical node to management by a third physical node.

In an embodiment, each physical node is configured to share workload information with others of the physical nodes according to a gossip protocol, the method further comprising, in a first physical node: storing state information regarding others of the physical nodes; and communicating with a second physical node on a selective basis to transmit state information of the first physical node and the stored state information regarding others of the physical nodes to the second physical node, receive state information of the second physical node and of at least a portion of the physical nodes from the second physical node, and store the received state information.

In still another embodiment, a computer-readable storage medium has program instructions recorded thereon that, when executed by at least one processing circuit, perform a method, the method comprising: executing a plurality of physical nodes; executing a plurality of sets of virtual nodes; managing each set of virtual nodes with a corresponding physical node; managing, by each virtual node, a respective set of directory blocks, wherein each directory block is a respective partition of a storage namespace and is managed by a corresponding single virtual node; and maintaining, by each virtual node, a directory block map that maps file system object names in a hierarchical namespace to entity block identifiers in the flat namespace for entity blocks stored in directories corresponding to the managed set of directory blocks.

V. Conclusion

While various embodiments of the present methods and systems have been described above, it should be understood that they have been presented by way of example only, and not limitation. It will be apparent to persons skilled in the relevant art that various changes in form and detail can be made therein without departing from the spirit and scope of the methods and systems. Thus, the breadth and scope of the present methods and systems should not be limited by any of the above-described exemplary embodiments, but should be defined only in accordance with the following claims and their equivalents.

What is claimed is:

1. A storage system, comprising:
   a physical node in a plurality of physical nodes, each physical node including a processor and memory that stores program code configured to manage virtual nodes; and
   a set of virtual nodes in a plurality of sets of virtual nodes, the set of virtual nodes managed by the physical node, each virtual node configured to manage a respective set of directory blocks, wherein each directory block is a respective partition of a flat namespace, and is managed by a corresponding single virtual node, and each virtual node maintains a directory block map that maps file system object names in a hierarchical namespace to entity block identifiers in the flat namespace for entity blocks stored in directories corresponding to the managed set of directory blocks, each virtual node comprising a mapping manager configured to:
receive a command regarding a first file system object from a name resolution node of the virtual nodes, the command indicating a name associated with the first file system object and a directory block identifier,
interact, according to the command, with an entry corresponding to the name and the directory block identifier in a directory block map associated with the virtual node; and
register, in a registry associated with the virtual node, the name resolution node of the virtual nodes in association with a path name indicated in the command.

2. The storage system of claim 1, wherein an entity block corresponding to an entity block identifier is a file or a folder.

3. The storage system of claim 1, wherein a file system object in the hierarchical namespace is identified at least by a path and a name; and
wherein a change made to the path of the file system object in the hierarchical namespace causes a modification to an entry in at least one directory block map for an entity block identifier of an entity block corresponding to the file system object, without the change causing a file or folder corresponding to the entity block to be moved in storage of the storage system.

4. The storage system of claim 1, wherein each virtual node comprises:
a command forwarder configured to
receive a command directed to a first file system object, the command indicating a path in the hierarchical namespace associated with the first file system object,
perform a hash function on the path to generate a first node identifier for a name resolution node of the virtual nodes, and
forward the command to the name resolution node to determine a storage node to handle the command.

5. The storage system of claim 4, wherein the command forwarder is further configured to:
receive an indication that the name resolution node is too busy to handle the command;
sequence the virtual nodes from the name resolution node to a next virtual node; and
forward the command to the next virtual node to determine the storage node.

6. The storage system of claim 1, wherein each virtual node comprises:
a path resolver configured to
receive a command regarding a first file system object from a query node of the virtual nodes, the command indicating a path in the hierarchical namespace associated with the first file system object,
determine a storage node corresponding to the path;
forward the command to the determined storage node, the storage node having a directory block map containing an entry that maps the first file system object to an entity block identifier in the flat namespace, and
register the entity block identifier and a timestamp in a cache associated with the virtual node.

7. The storage system of claim 1, wherein the mapping manager is further configured to:
respond regarding the command to a query node of the virtual nodes.

8. The storage system of claim 7, wherein the mapping manager is further configured to:
receive an indication the path name changed; and
in response to the indicated path name change, notify the name resolution node that an entry in a cache of the resolution node associated with the path name is invalid.

9. The storage system of claim 1, wherein the physical node comprises:
a virtual node manager configured to increase a horizontal scale of the storage namespace, the virtual node generator configured to
generate an additional virtual node corresponding to an additional set of directory blocks, and
add the additional virtual node to a set of virtual nodes managed by a physical node.

10. The storage system of claim 1, wherein the physical node comprises:
an activity monitor configured to determine that a second physical node is overburdened, and
a virtual node manager configured to transition management of a virtual node managed by the second physical node to management by a third physical node.

11. The storage system of claim 10, wherein the third physical node is an additional node added to the physical nodes to increase horizontal scale of the physical nodes and to manage at least the second physical node.

12. A storage system, comprising:
a physical node in a plurality of physical nodes, each physical node including a processor and memory that stores program code configured to manage virtual nodes; and
a set of virtual nodes in a plurality of sets of virtual nodes, the set of virtual nodes managed by the physical node, each virtual node configured to manage a respective set of directory blocks, wherein each directory block is a respective partition of a flat namespace, and is managed by a corresponding single virtual node, and each virtual node maintains a directory block map that maps file system object names in a hierarchical namespace to entity block identifiers in the flat namespace for entity blocks stored in directories corresponding to the managed set of directory blocks, wherein the first physical node is configured to share workload information with others of the physical nodes according to a gossip protocol;
wherein the first physical node comprises a node state communicator configured to:
store state information regarding others of the physical nodes; and
communicate with a second physical node on a selective basis to
transmit state information of the physical node and the stored state information regarding others of the physical nodes to the second physical node,
receive state information of the second physical node and of at least a portion of the physical nodes from the second physical node, and
store the received state information.

13. The storage system of claim 12, wherein the state information of the first physical node includes at least one of:
an operational state of the first physical node;

a central processing unit (CPU) load of the first physical node;
a memory load of the first physical node;
a queries per second (QPS) of the first physical node;
a number of managed directory blocks managed by the first physical node; or
an identification of one or more directory blocks having a highest management cost of directory blocks managed by the first physical node.

14. The storage system of claim 1, wherein the physical node includes an activity monitor configured to determine that a directory block managed by a virtual node is overburdened, and
a virtual node manager configured to transmit a split request to the virtual node to cause the virtual node to split the directory block into a first sub-directory block and a second sub-directory block.

15. A computer-implemented method in a storage system, comprising:
executing a plurality of physical nodes;
executing a plurality of sets of virtual nodes;
managing each set of virtual nodes with a corresponding physical node;
managing, by each virtual node, a respective set of directory blocks, wherein each directory block is a respective partition of a storage namespace and is managed by a corresponding single virtual node;
maintaining, by each virtual node, a directory block map that maps file system object names in a hierarchical namespace to entity block identifiers in the flat namespace for entity blocks stored in directories corresponding to the managed set of directory blocks; and
performing the following in a virtual node:
receiving a command regarding a first file system object from a name resolution node of the virtual nodes, the command indicating a name associated with the first file system object and a directory block identifier,
interacting, according to the command, with an entry corresponding to the name and the directory block identifier in a directory block map associated with the virtual node,
registering, in a registry associated with the virtual node, the name resolution node in association with a path name indicated in the command.

16. The method of claim 15, further comprising, in a virtual node:
responding regarding the command to a query node of the virtual nodes.

17. The method of claim 16, further comprising, in a virtual node:
receiving an indication the path name changed; and
in response to the indicated path name change, notifying the name resolution node that an entry in a cache of the resolution node associated with path name is invalid.

18. The method of claim 15, further comprising, in a first physical node:
determining that a second physical node is overburdened; and
transitioning management of a virtual node managed by the second physical node to management by a third physical node.

19. A computer-implemented method in a storage system, comprising:
executing a plurality of physical nodes;
executing a plurality of sets of virtual nodes;
managing each set of virtual nodes with a corresponding physical node;
managing, by each virtual node, a respective set of directory blocks, wherein each directory block is a respective partition of a storage namespace and is managed by a corresponding single virtual node; and
maintaining, by each virtual node, a directory block map that maps file system object names in a hierarchical namespace to entity block identifiers in the flat namespace for entity blocks stored in directories corresponding to the managed set of directory blocks wherein each physical node is configured to share workload information with others of the physical nodes according to a gossip protocol, the method further comprising, in a first physical node:
storing state information regarding others of the physical nodes; and
communicating with a second physical node on a selective basis to
transmit state information of the first physical node and the stored state information regarding others of the physical nodes to the second physical node,
receive state information of the second physical node and of at least a portion of the physical nodes from the second physical node, and
store the received state information.

20. A computer-readable storage medium having program instructions recorded thereon that, when executed by at least one processing circuit, perform a method on a first computing device, the method comprising:
executing a plurality of physical nodes;
executing a plurality of sets of virtual nodes;
managing each set of virtual nodes with a corresponding physical node;
managing, by each virtual node, a respective set of directory blocks, wherein each directory block is a respective partition of a storage namespace and is managed by a corresponding single virtual node; and
maintaining, by each virtual node, a directory block map that maps file system object names in a hierarchical namespace to entity block identifiers in the flat namespace for entity blocks stored in directories corresponding to the managed set of directory blocks; and
performing the following in a virtual node:
receiving a command regarding a first file system object from a name resolution node of the virtual nodes, the command indicating a name associated with the first file system object and a directory block identifier,
interacting, according to the command, with an entry corresponding to the name and the directory block identifier in a directory block map associated with the virtual node,
registering, in a registry associated with the virtual node, the name resolution node in association with a path name indicated in the command.

* * * * *